(12) United States Patent
Zhang et al.

(10) Patent No.: US 12,464,525 B2
(45) Date of Patent: Nov. 4, 2025

(54) TRANSMITTING METHOD AND RECEIVING METHOD FOR CONTROL INFORMATION, USER EQUIPMENT AND BASE STATION

(71) Applicant: Samsung Electronics Co., Ltd., Gyeonggi-do (KR)

(72) Inventors: Sa Zhang, Beijing (CN); Yi Wang, Beijing (CN); Jingxing Fu, Beijing (CN); Feifei Sun, Beijing (CN)

(73) Assignee: Samsung Electronics Co., Ltd., Seoul (KR)

( * ) Notice: Subject to any disclaimer, the term of this patent is extended or adjusted under 35 U.S.C. 154(b) by 281 days.

(21) Appl. No.: 17/392,945

(22) Filed: Aug. 3, 2021

(65) Prior Publication Data

US 2022/0039088 A1  Feb. 3, 2022

(30) Foreign Application Priority Data

Aug. 3, 2020  (CN) .......................... 202010768239.9
Nov. 5, 2020  (CN) .......................... 202011224507.7

(Continued)

(51) Int. Cl.
*H04W 72/21* (2023.01)
*H04L 1/00* (2006.01)

(52) U.S. Cl.
CPC ........... *H04W 72/21* (2023.01); *H04L 1/0002* (2013.01)

(58) Field of Classification Search
CPC .............................. H04W 72/21; H04L 1/0002
See application file for complete search history.

(56) References Cited

U.S. PATENT DOCUMENTS 11,968,676 B2  4/2024  Li et al.
2016/0212649 A1  7/2016  Chen et al.
(Continued)

FOREIGN PATENT DOCUMENTS

CN  111294306 A  * 6/2020  ........... H04L 27/261
CN  111314033    6/2020
(Continued)

OTHER PUBLICATIONS

3rd Generation Partnership Project; Technical Specification Group Radio Access Network; NR; Multiplexing and channel coding (Release 16), Jun. 2020.

(Continued)

*Primary Examiner* — Derrick W Ferris
*Assistant Examiner* — Jesse P. Samluk
(74) *Attorney, Agent, or Firm* — The Farrell Law Firm, P.C.

(57) ABSTRACT

A method and apparatus are provided for transmitting and receiving control information. A method performed by a UE includes receiving, from a base station, DCI or a higher layer signaling; when first priority UCI and second priority UCI are transmitted in a same physical uplink channel, separately encoding the first priority UCI and the second priority UCI, based on a first number of bits of the first priority UCI and a second number of bits of the second priority UCI; and transmitting, based on the DCI or the higher layer signaling, the encoded first priority UCI and the second priority UCI, to the base station, on the same physical uplink channel.

17 Claims, 11 Drawing Sheets

(30) Foreign Application Priority Data

| Mar. 12, 2021 | (CN) | .......................... 202110272377.2 |
| Apr. 29, 2021 | (CN) | .......................... 202110473277.6 |
| May 31, 2021 | (CN) | .......................... 202110604322.7 |

(56) References Cited

U.S. PATENT DOCUMENTS

| 2016/0218790 | A1* | 7/2016 | Hwang | ................. H04L 5/0057 |
| 2018/0167933 | A1 | 6/2018 | Yin et al. | |
| 2019/0053097 | A1* | 2/2019 | Rico Alvarino | ...... H04L 1/0029 |
| 2019/0140793 | A1* | 5/2019 | Takeda | ..................... H04J 11/00 |
| 2019/0215823 | A1* | 7/2019 | Kim | ........................... H04L 1/18 |
| 2020/0228248 | A1 | 7/2020 | Islam et al. | |
| 2021/0160732 | A1* | 5/2021 | Lee | ....................... H04L 1/1671 |
| 2021/0250134 | A1* | 8/2021 | Islam | ................... H04L 1/1819 |
| 2021/0321394 | A1 | 10/2021 | Li et al. | |
| 2022/0078768 | A1* | 3/2022 | El Hamss | ............. H04L 5/0055 |
| 2022/0132496 | A1* | 4/2022 | Lu | ......................... H04W 72/21 |
| 2023/0170958 | A1* | 6/2023 | Khoshnevisan | ...... H04W 52/42 |
| | | | | 375/262 |

FOREIGN PATENT DOCUMENTS

| EP | 3 734 922 | 11/2020 |
| JP | 2022-514038 | 2/2022 |
| WO | WO 2019/130521 | 7/2019 |
| WO | WO 2020/135214 | 7/2020 |
| WO | WO 2020/146247 | 7/2020 |

OTHER PUBLICATIONS

3rd Generation Partnership Project; Technical Specification Group Radio Access Network; NR; Physical layer procedures for control (Release 16), Jun. 2020.

Huawei, HiSilicon, "Corrections on UCI Enhancement", R1-2003528, 3GPP TSG RAN WG1 Meeting #101-e, May 25-Jun. 5, 2020, 12, pages.

International Search Report dated Nov. 12, 2021 issued in counterpart application No. PCT/KR2021/010082, 9 pages.

InterDigital Inc., "UCI Enhancements for eURLLC", R1-1909065, 3GPP TSG RAN WG1 #98, Aug. 26-30, 2019, 7 pages.

Ericsson, "On UCI Multiplexing on PUCCH", R1-1802906, 3GPP TSG RAN WG1 Meeting#92, Feb. 26-Mar. 2, 2018, 8 pages.

European Search Report dated Jan. 4, 2024 issued in counterpart application No. 21852792.7-1206, 12 pages.

Nokia, "Maintenance of Rel-16 URLLC UCI Enhancements", R1-2000405, 3GPP TSG RAN WG1 Meeting #100, Feb. 24-Mar. 6, 2020, 25 pages.

Chinese Office Action dated Apr. 14, 2025 issued in counterpart application No. 202110604322.7, 15 pages.

Japanese Office Action dated May 7, 2025 issued in counterpart application No. 2023-507759, 14 pages.

EP Communication Report dated May 21, 2025 issued in counterpart application No. 21852792.7-1206, 6 pages.

\* cited by examiner

FIG. 9

Receive, by a base station, first uplink control information UCI with a first priority and second UCI with a second priority from a UE on the same uplink channel, where the first priority is different from the second priority, and where the first UCI and the second UCI are separately encoded — S910

TRANSMITTING METHOD AND RECEIVING METHOD FOR CONTROL INFORMATION, USER EQUIPMENT AND BASE STATION

CROSS-REFERENCE TO RELATED APPLICATION(S)

This application is based on and claims priority under 35 U.S.C. § 119 to Chinese Patent Application Nos. 202010768239.9, 202011224507.7, 202110272377.2, 202110473277.6, and 202110604322.7, which were filed in the Chinese Patent Office on Aug. 3, 2020, Nov. 5, 2020, Mar. 12, 2021, Apr. 29, 2021, and May 31, 2021, respectively, the entire disclosure of each of which is incorporated herein by reference.

BACKGROUND

1. Field

The disclosure relates generally to wireless communication, and more particularly, to methods for transmitting and receiving control information, and a user equipment, a base station, and a computer-readable storage medium that perform the methods.

2. Description of Related Art

To meet the increasing demand for wireless data traffic since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, in order to provide higher data rates.

To decrease propagation loss of the radio waves and increase the transmission distance, beamforming, massive multiple-input multiple-output (MIMO), full dimensional MIMO (FD-MIMO), array antennas, analog beamforming, and large scale antenna techniques are being discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), RX-end interference cancellation, etc.

In 5G systems, hybrid frequency shift keying (FSK) and quadrature amplitude modulation (FQAM) and sliding window superposition coding (SWSC) have been developed for advanced coding modulation (ACM), and filter bank multi carrier (FBMC), non-orthogonal multiple access (NOMA), and sparse code multiple access (SCMA) have been developed as advanced access technologies.

The Internet is now evolving to the Internet of things (IoT) where distributed entities, i.e., things, exchange and process information without human intervention. The Internet of everything (IoE), which is a combination of the IoT technology and big data processing technology, through connection with a cloud server, has also emerged.

As technology elements, such as "sensing technology", "wired/wireless communication and network infrastructure", "service interface technology", and "security technology" have been demanded for IoT implementation, a sensor network, machine-to-machine (M2M) communication, machine type communication (MTC), etc., have been researched. By collecting and analyzing data generated among connected things, IoT may be applied to a variety of fields including smart homes, smart buildings, smart cities, smart or connected cars, smart grids, health care, smart appliances, and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered as an example of convergence between the 5G technology and the IoT technology.

As described above, various services may be provided according to the development of wireless communication systems, and thus methods for easily and efficiently providing such services are required.

SUMMARY

Accordingly, the disclosure is provided to address at least the problems and/or disadvantages described above and to provide at least the advantages described below.

In accordance with an aspect of the disclosure, a method is provided for transmitting uplink control information (UCI). The method includes receiving, from a base station, downlink control information (DCI) or a higher layer signaling; when first priority UCI and second priority UCI are to be transmitted in a same physical uplink channel, separately encoding the first priority UCI and the second priority UCI, based on a first number of bits of the first priority UCI and a second number of bits of the second priority UCI; and transmitting, based on the DCI or the higher layer signaling, the encoded first priority UCI and the encoded second priority UCI, to the base station, on the same physical uplink channel.

In accordance with another aspect of the disclosure, a method is provided for UCL The method includes transmitting, to a user equipment (UE), DCI or a higher layer signaling; and receiving encoded first priority UCI and encoded second priority UCI, from the UE, on a same physical uplink channel. When the first priority UCI and the second priority UCI are transmitted in the same physical uplink channel, the first priority UCI and the second priority UCI are separately encoded based on a first number of bits of the first priority UCI and a second number of bits of the second priority UCI.

In accordance with another aspect of the disclosure, a UE is provided. The UE includes a transceiver; and at least one processor configured to receive, from a base station, DCI or a higher layer signaling, when first priority UCI and second priority UCI are to be transmitted in a same physical uplink channel, separately encode the first priority UCI and the second priority UCI, based on a first number of bits of the first priority UCI and a second number of bits of the second priority UCI, and transmit, based on the DCI or the higher layer signaling, the encoded first priority UCI and the encoded second priority UCI, to the base station, on the same physical uplink channel.

In accordance with another aspect of the disclosure, a base station is provided. The base station includes a transceiver; and at least one processor configured to transmit to a UE, DCI or a higher layer signaling, and receive encoded first priority UCI and encoded second priority UCI, from the UE, on a same physical uplink channel. When the first priority UCI and the second priority UCI are transmitted in the same physical uplink channel, the first priority UCI and the second priority UCI are separately encoded based on a first number of bits of the first priority UCI and a second number of bits of the second priority UCI.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 9 is a flowchart illustrating a method performed by a base station according to an embodiment.

DETAILED DESCRIPTION

Figure 1:
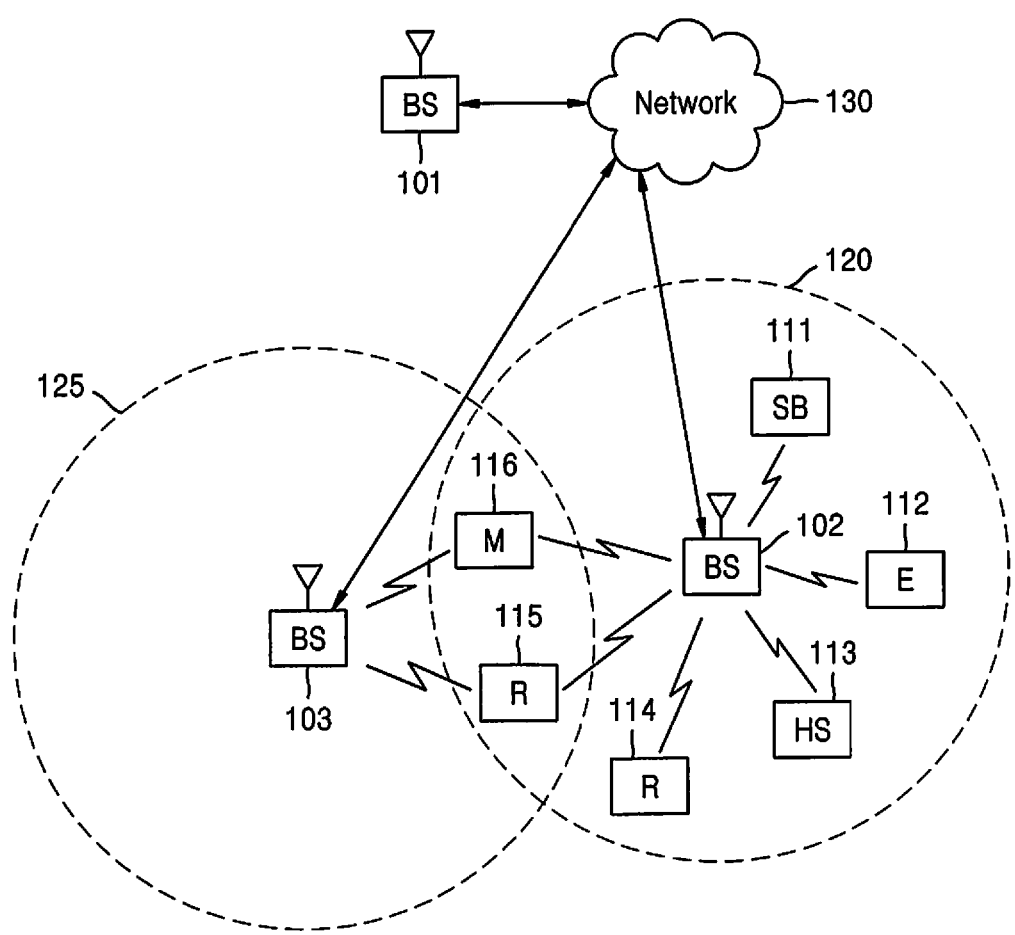
FIG. 1 illustrates a wireless network according an embodiment.

Various embodiments of the disclosure will now be described in detail with reference to the accompanying drawings. In the following description, specific details such as detailed configuration and components are merely provided to assist the overall understanding of these embodiments of the disclosure. Therefore, to those skilled in the art will appreciate that various changes and modifications of the embodiments described herein can be made without departing from the scope and spirit of the disclosure. In addition, descriptions of well-known functions and constructions are omitted for clarity and conciseness.

Herein, the term "couple" and its derivatives may refer to any direct or indirect communication between two or more elements, whether or not those elements are in physical contact with one another. Similar words such as "connect" or "connected" are not limited to physical or mechanical connection, but can include electrical connection, whether direct or indirect.

The terms "transmit", "receive", and "communicate", as well as derivatives thereof, may encompass both direct and indirect communication. The terms "include" and "comprise", as well as derivatives thereof, signify inclusion without limitation. That is, words such as "include" or "comprise" may indicate that elements or objects appearing before the word encompass the listed elements or objects appearing after the word and their equivalents, but other elements or objects are not excluded.

The term "or" is inclusive, meaning and/or. The phrase "associated with", as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, etc. The term "controller" may refer to any device, system or part thereof that controls at least one operation. A controller can be implemented in hardware or a combination of hardware and software and/or firmware. The functionality associated with any particular controller can be centralized or distributed, whether locally or remotely.

The phrase "at least one of", when used with a list of items, indicates that different combinations of one or more of the listed items can be used, and only one item in the list can be needed. For example, "at least one of: A, B, or C" includes any of the following combinations: A, B, C, A and B, A and C, B and C, and A, B, and C.

Various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read-only memory (ROM), random access memory (RAM), a hard disk drive, a compact disc (CD), a digital video disc (DVD), or any other type of memory.

A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Terms used herein to describe the embodiments of the present disclosure are not intended to limit and/or define the scope of the present disclosure. For example, unless otherwise defined, the technical terms or scientific terms used in the present disclosure shall have the ordinary meaning understood by those with ordinary skills in the art to which the present disclosure belongs.

Terms such as "first", "second" and similar words used in the disclosure do not express any order, quantity or importance, but are used to distinguish different components. Unless otherwise indicated by the context clearly, similar words such as "a", "an" or "the" in a singular form do not express a limitation of quantity, but express an existence of at least one.

As used herein, any reference to "one example" or "example", "one embodiment" or "embodiment" indicates that particular elements, features, structures or characteristics described in connection with the embodiment is included in at least one embodiment. The phrases "in one embodiment" or "in one example" appearing in different places in the specification do not necessarily refer to the same embodiment.

"Upper", "lower", "left" and "right" are only used to express a relative positional relationship, and when an absolute position of the described object changes, the relative positional relationship may change accordingly.

The various embodiments discussed below for describing the disclosure are for illustration only and should not be interpreted as limiting the scope of the present disclosure in any way. Those skilled in the art will understand that the disclosure can be implemented in any suitably arranged wireless communication system. For example, although the detailed description of the embodiments of the disclosure will be directed to LTE and 5G, those skilled in the art can understand that the disclosure can also be applied to other communication systems with similar technical backgrounds and channel formats with slight modifications without departing from the scope of the disclosure. For example, the communication systems may include a global system for a mobile communications (GSM) system, a code division multiple access (CDMA) system, a wideband CDMA (WCDMA) system, a general packet radio service (GPRS), an LTE system, an LTE frequency division duplex (FDD) system, an LTE time division duplex (TDD), a universal mobile telecommunications system (UMTS), worldwide interoperability for microwave access (WiMAX) communication system, 5G system or new radio (NR), etc. In addition, the technical schemes of the embodiments of the disclosure can be applied to future-oriented communication technologies.

Depending on a type of a network, terms such as "access point (AP)", "gNodeB (gNB)" may be used instead of "base station". Herein, the terms "gNodeB" and "gNB" are used predominantly to refer to network infrastructure components that provide wireless access for remote terminals.

Similarly, depending on the type of the network terms such as "mobile station", "user station", "remote terminal", "wireless terminal" or "user apparatus" can be used instead of "UE". For example, the terms "terminal" and "UE" are used herein to refer to remote wireless devices that wirelessly access the gNB, regardless of whether the UE is a mobile device (such as a mobile phone or a smart phone) or a fixed device (such as a desktop computer or a vending machine).

FIG. 1 illustrates a wireless network according to an embodiment.

Referring to FIG. 1, the wireless network includes a gNB 101, a gNB 102, and a gNB 103. The gNB 101 communicates with the gNB 102 and the gNB 103. The gNB 101 also communicates with at least one Internet protocol (IP) network 130, such as the Internet, a private IP network, or other data networks.

The gNB 102 provides wireless broadband access to the network 130 for a first plurality of UEs within a coverage area 120 of the gNB 102. The first plurality of UEs include a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second R; a UE 116, which may be a mobile device (M), such as a cellular phone, a wireless laptop computer, a wireless personal digital assistant (PDA), etc.

The GNB 103 provides wireless broadband access to the network 130 for a second plurality of UEs within a coverage area 125 of the gNB 103. The second plurality of UEs include the UE 115 and the UE 116. One or more of the gNBs 101-103 can communicate with each other and with the UEs 111-116 using 5G, LTE, LTE-A, WiMAX or other advanced wireless communication technologies.

In FIG. 1, the dashed lines show approximate ranges of the coverage areas 120 and 125, and the ranges are shown as approximate circles merely for illustration and explanation purposes. However, the coverage areas associated with the gNBs, such as the coverage areas 120 and 125, may have other shapes, including irregular shapes, depending on configurations of the gNBs and changes in the radio environment associated with natural obstacles and man-made obstacles.

One or more of the gNBs 101, 102, and 103 may include a 2-dimensional (2D) antenna array. Further, one or more of the gNBs 101, 102, and 103 support codebook designs and structures for systems with 2D antenna arrays.

Various changes can be made to the wireless network illustrated in FIG. 1. For example, the wireless network may include any number of gNBs and any number of UEs in any suitable arrangement. Further, the gNB 101 can directly communicate with any number of UEs and provide wireless broadband access to the network 130 for those UEs. Similarly, each of the gNBs 102-103 can directly communicate with the network 130 and provide direct wireless broadband access to the network 130 for the UEs. In addition, the gNBs 101, 102 and/or 103 can provide access to other or additional external networks, such as external telephone networks or other types of data networks.

Figure 2A:
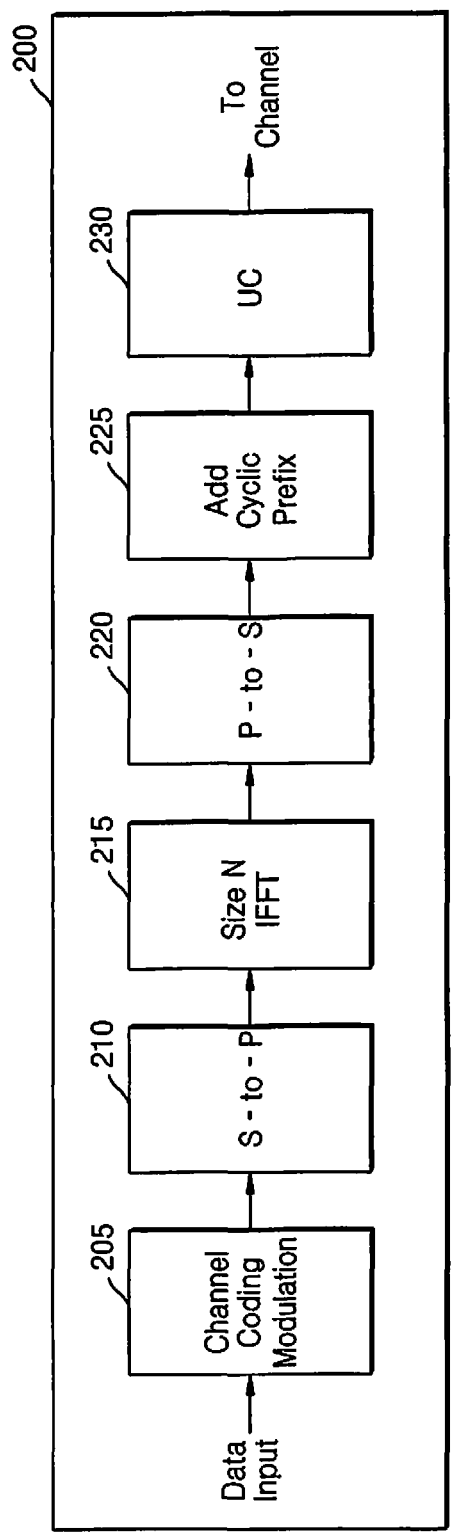
FIG. 2A illustrates a wireless transmission path according to an embodiment.
Figure 2B:
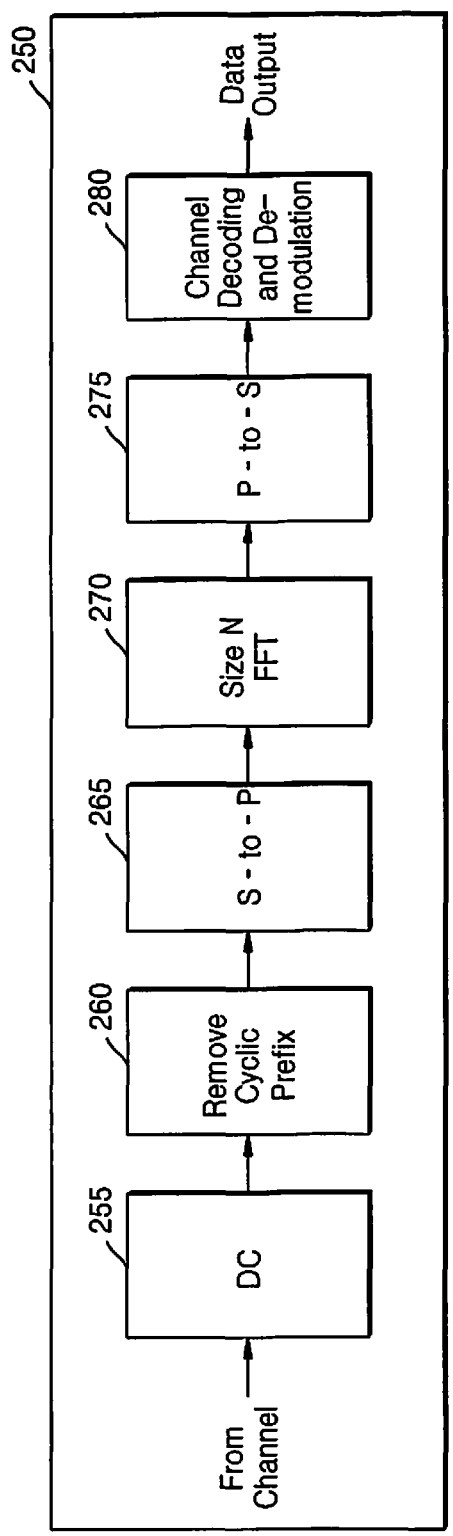
FIG. 2B illustrates a wireless reception path according to an embodiment.

FIG. 2A illustrates a wireless transmission path according to an embodiment, and FIG. 2B illustrates a wireless reception path according to an embodiment.

Referring to FIGS. 2A and 2B, a transmission path 200 can be described as being implemented in a gNB, such as the gNB 102 in FIG. 1, and the reception path 250 can be described as being implemented in a UE, such as the UE 116 in FIG. 1. However, the reception path 250 can also be implemented in a gNB and the transmission path 200 can also be implemented in a UE. The reception path 250 may be configured to support codebook designs and structures for systems with 2D antenna arrays.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230.

The reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or QAM) to generate a sequence of frequency-domain modulated symbols. The S-to-P block 210 converts (e.g., demultiplexes) serial modulated symbols into parallel data to generate N parallel symbol streams, where N is a size of the IFFT/FFT used in the gNB and UE. The size N IFFT block 215 performs IFFT operations on the N parallel symbol streams to generate a time-domain output signal. The P-to-S block 220 converts (e.g., multiplexes) parallel time-domain output symbols from the Size N IFFT block 215 to generate a serial time-domain signal. The cyclic prefix addition block 225 inserts a cyclic prefix into the time-domain signal. The up-converter 230 modulates (i.e., up-converts) the output of the cyclic prefix addition block 225 to a radio frequency (RF) frequency for transmission via a wireless channel. The signal can also be filtered at a baseband before switching to the RF frequency.

The RF signal transmitted from the gNB arrives at the UE after passing through the wireless channel, and operations in reverse to those at the gNB are then performed at the UE.

More specifically, the down-converter 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of the gNBs 101-103 illustrated in FIG. 1 may implement the transmission path 200 for transmitting to the UEs 111-116 in the downlink, and may implement the reception path 250 for receiving from the UEs 111-116 in the uplink. Similarly, each of the UEs 111-116 may implement the transmission path 200 for transmitting to the gNBs 101-103 in the uplink, and may implement the reception path 250 for receiving from the gNBs 101-103 in the downlink.

Each of the components in FIGS. 2A and 2B may be implemented using only hardware, or using a combination of hardware and software/firmware. That is, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Although FIGS. 2A and 2B are described above as using FFT and IFFT, this is only illustrative and should not be interpreted as limiting the scope of the disclosure. Other types of transforms can be used, such as discrete Fourier transform (DFT) and inverse DFT (IDFT) functions. For DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Further, the various components in FIGS. 2A and 2B can be combined, further subdivided, or omitted, and additional components can be added according to specific requirements. Additionally, other suitable architecture can be used to support wireless communication in a wireless network.

Figure 3A:
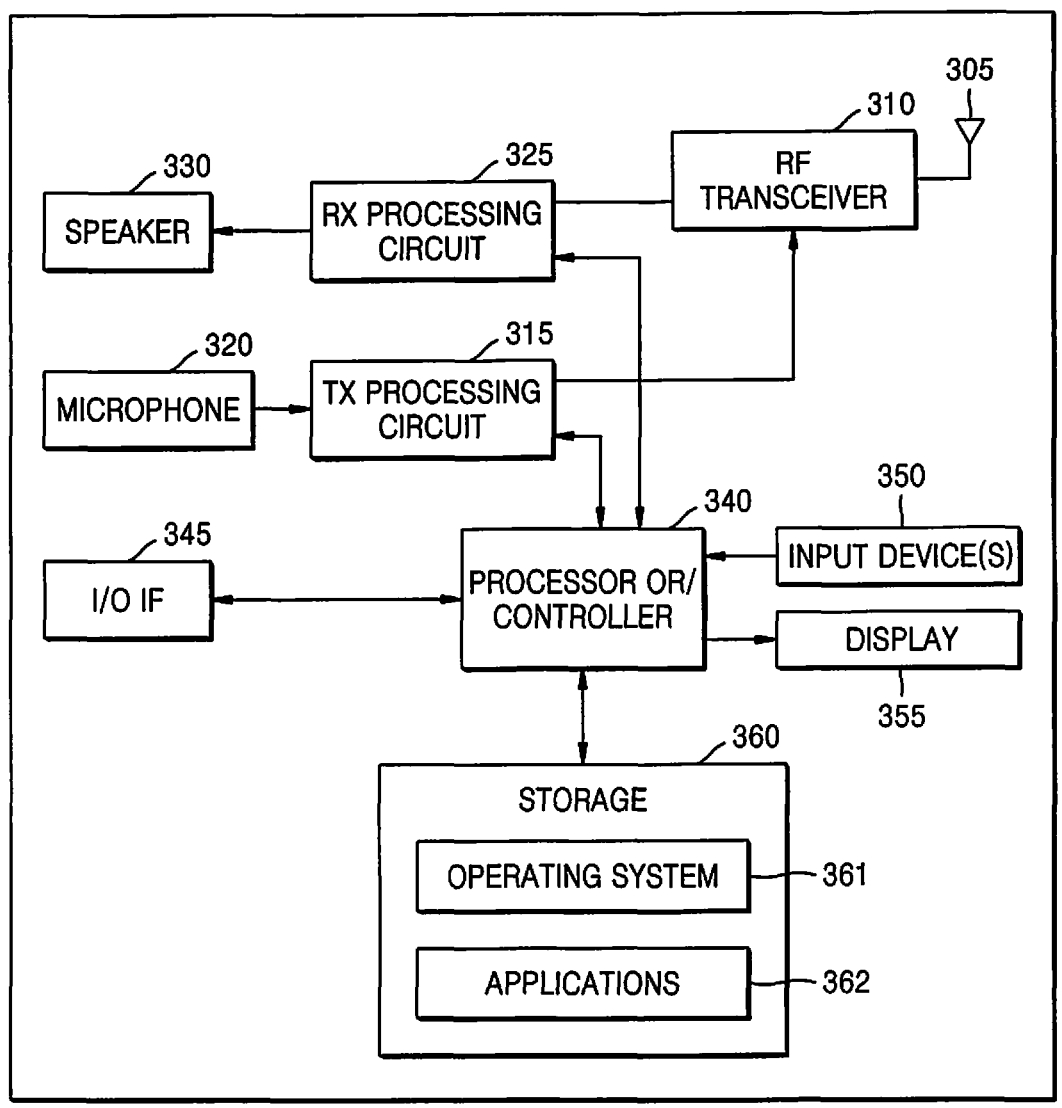
FIG. 3A illustrates a UE according to an embodiment.

FIG. 3A illustrates a UE according to an embodiment. For example, the UE 116 of FIG. 1 may be constructed as illustrated in FIG. 3A Referring to FIG. 3A, the UE includes an antenna 305, an RF transceiver 310, a transmission (TX) processing circuit 315, a microphone 320, and a reception (RX) processing circuit 325. The UE also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of a wireless network from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal.

The RX processing circuit 325 transmits the processed baseband signal to speaker 330 (such as for voice data) or to processor/controller 340 for further processing (such as for web browsing data).

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute the OS 361 stored in the memory 360 in order to control the overall operation of the UE. For example, the processor/controller 340 can control the RX of forward channel signals and the TX of backward channel signals through the RF transceiver 310, the RX processing circuit 325 and the TX processing circuit 315 according to well-known principles. The processor/controller 340 may include at least one microprocessor or microcontroller.

The processor/controller 340 is also capable of executing other processes and programs residing in the memory 360, such as operations for channel quality measurement and reporting for systems with 2D antenna arrays. The processor/controller 340 can move data into or out of the memory 360 as required by an execution process. The processor/controller 340 may execute the application 362 based on the OS 361 or in response to signals received from the gNB or the operator. The processor/controller 340 is coupled to the I/O interface 345, which provides the UE with the ability to connect to other devices, such as laptop computers and handheld computers. The I/O interface 345 is a communication path between these accessories and the processor/controller 340.

The processor/controller 340 is coupled to the input device(s) 350 and the display 355. An operator of the UE can input data into the UE using the input device(s) 350. The display 355 may be a liquid crystal display (LCD) or other display capable of presenting text and/or at least limited graphics (such as from a website). The memory 360 is coupled to the processor/controller 340. A part of the memory 360 can include a RAM, while another part of the memory 360 can include a flash memory or other ROM.

Various changes can also be made to the UE illustrated in FIG. 3A. For example, various components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Further, although FIG. 3A illustrates that the UE is configured as a mobile phone or a smart phone, UEs can be configured to operate as other types of mobile or fixed devices.

Figure 3B:
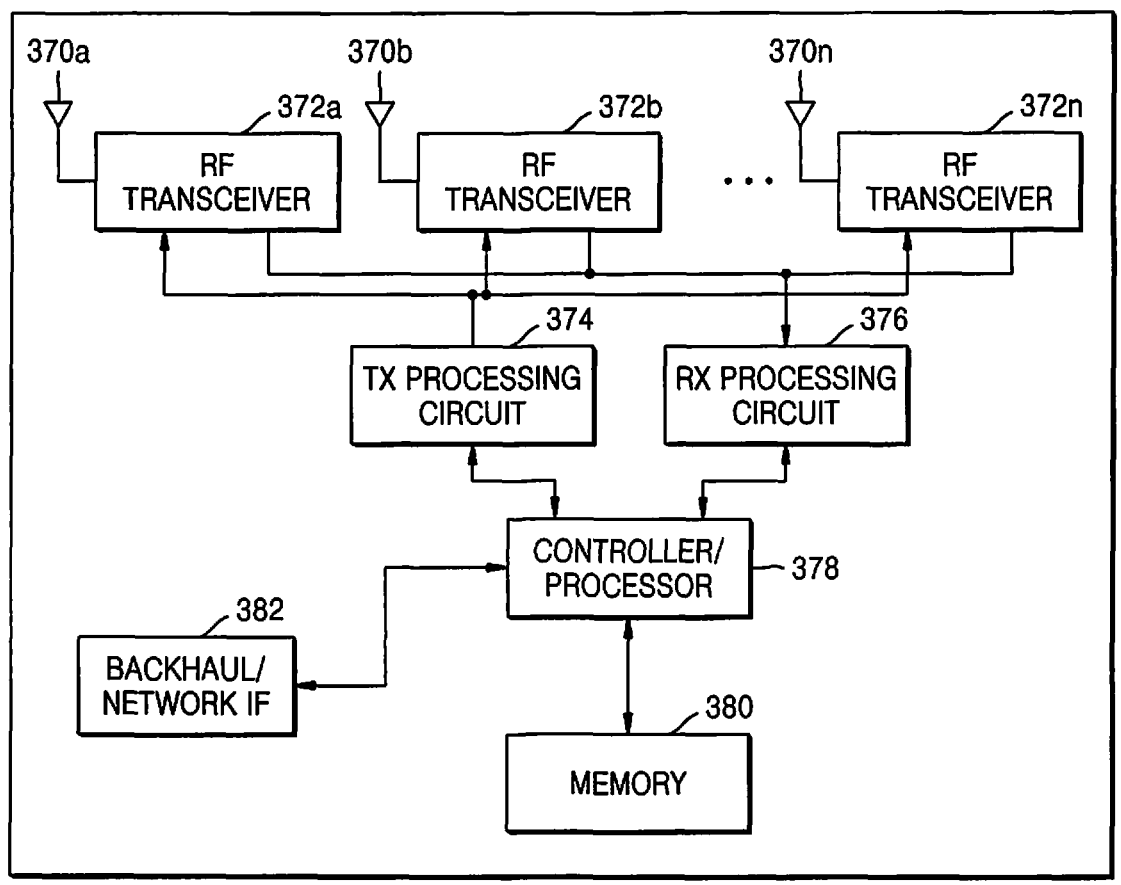
FIG. 3B illustrates a base station according to an embodiment.

FIG. 3B illustrates an gNB according to an embodiment. For example, the gNB 102 of FIG. 1 may be constructed as illustrated in FIG. 3B.

Referring to FIG. 3B, the gNB includes antennas 370a-370n, RF transceivers 372a-372n, a TX processing circuit 374, and a RX processing circuit 376. One or more of the antennas 370a-370n may include a 2D antenna array. The gNB also includes a controller/processor 378, a memory 380, and a backhaul or network interface 382.

The RF transceivers 372a-372n receive an incoming RF signal from antennas 370a-370n, respectively, such as a signal transmitted by UEs or other gNBs. The RF transceivers 372a-372n down-convert the incoming RF signal to generate an IF or baseband signal. The IF or baseband signal is transmitted to the RX processing circuit 376, which generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from TX processing circuit 374 and up-convert the baseband or IF signal into an RF signal transmitted via the antennas 370a-370n.

The controller/processor 378 can include one or more processors or other processing devices that control the overall operation of the gNB. For example, the controller/processor 378 can control the RX of forward channel signals and the TX of backward channel signals through the RF transceivers 372a-372n, the RX processing circuit 376, and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. The controller/processor 378 may support any of a variety of other functions in the gNB. The controller/processor 378 may include at least one microprocessor or microcontroller.

The controller/processor 378 is also capable of executing programs and other processes residing in the memory 380, such as an OS. The controller/processor 378 can also support channel quality measurement and reporting for systems with 2D antenna arrays. The controller/processor 378 may support communication between entities such as web radio TC controllers (RTCs). The controller/processor 378 can move data into or out of the memory 380 as required by an execution process.

The controller/processor 378 is coupled to the backhaul or network interface 382. The backhaul or network interface 382 allows the gNB to communicate with other devices or systems through a backhaul connection or through a network. The backhaul or network interface 382 can support communication over any suitable wired or wireless connection(s). For example, when the gNB is implemented as a part of a cellular communication system, such as a cellular communication system supporting 5G, NR, LTE or LTE-A, the backhaul or network interface 382 can allow the gNB to communicate with other gNBs through wired or wireless backhaul connections. When the gNB is implemented as an AP, the backhaul or network interface 382 can allow the gNB to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. A plurality of instructions, such as a BIS algorithm, may be stored in the memory. The plurality of instructions are configured to cause the controller/processor 378 to execute the BIS process and decode the received signal after subtracting at least one interference signal determined by the BIS algorithm.

As will be described in more detail below, the TX and RX paths of the gNB (implemented using RF transceivers 372a-372n, TX processing circuit 374 and/or RX processing circuit 376) support aggregated communication with FDD cells and TDD cells.

Various changes may also be made to the gNB illustrated in FIG. 3B. For example, the gNB can include any number of each component shown in FIG. 3A. More specifically, the AP can include many backhaul or network interfaces 382, and the controller/processor 378 can support routing functions to route data between different network addresses. Additionally, although illustrated as including a single TX processing circuit 374 and a single RX processing circuit 376, the gNB can include multiple RX and TX processing circuits (e.g., one for each RF transceiver).

Those skilled in the art can understood that, a "terminal" and "terminal device" as used herein include devices with wireless signal receivers which have no transmitting capabilities and devices with receiving and transmitting hardware that can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a PDA, which may include an RF receiver, a pager, Internet/intranet access, a web browser, a notepad, a calendar and/or a global positioning system (GPS) receiver; a laptop and/or palmtop computer or other devices having and/or including an RF receiver.

A "Terminal" and "terminal device" as used herein may be portable, transportable, installed in vehicles (aviation, sea transportation and/or land), or suitable and/or configured to operate locally, and/or in distributed form, operate on the earth and/or any other position in space. A "Terminal" and "terminal device" as used herein may also be a communication terminal, an Internet terminal, a music/video playing terminal, such as a PDA, a mobile Internet device (MID) and/or a mobile phone with music/video playing functions, a smart TV, a set-top box, etc.

To support more flexible scheduling, the 3rd Generation Partnership Project (3GPP) has decided to support variable hybrid automatic repeat request (HARQ)-acknowledgement (ACK) feedback delay in 5G. In existing LTE systems, a time from RX of downlink data to uplink TX of HARQ-ACK is fixed. For example, in FDD systems, the delay is 4 subframes. In TDD systems, a HARQ-ACK feedback delay is determined for a corresponding downlink subframe according to an uplink and downlink configuration.

In 5G systems, whether FDD or TDD systems, for a determined downlink time unit (e.g., a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined according to factors such as different services or user capabilities.

The 3GPP has defined three directions of 5G application scenarios—enhanced mobile broadband (eMBB), massive MTC (mMTC) and ultra-reliable and low-latency communication (URLLC). The eMBB scenario is intended to further improve data TX rate based on existing mobile broadband service scenarios, to enhance user experiences and pursue improved communication experiences between people. mMTC and URLLC are the application scenarios of the IoT, but their respective emphases are different. mMTC is mainly for information interaction between people and things, while URLLC mainly for reflecting communication requirements between things.

In 5G, eMBB and URLLC will adopt a way of joint networking, wherein both URLLC services and eMBB services are supported in the same cell. Since URLLC services may be sparse services, compared with URLLC alone networking, eMBB and URLLC joint networking can improve the spectrum efficiency of the system. When there are URLLC services in the system, it is preferred to schedule URLLC services, and when there are no URLLC services in the system or the resources occupied by URLLC services are less, eMBB services can be scheduled.

At present, when there is a conflict between URLLC services and eMBB services, data and/or control information of the URLLC services will be preferentially transmitted, thus degrading performance of the eMBB services. Therefore, how to optimize the TX of data and control information of eMBB services is a problem that needs to be solved urgently.

To address the above-described problems, methods are provided below for transmitting signals in a wireless communication system, for receiving signals in a wireless communication system, and a terminal, a base station, and a non-transitory computer-readable storage medium are also provided for performing these methods.

Herein, a first type of transceiving node may be a base station (or gNB), and a second type of transceiving node may be a UE. However, the first type of transceiving node and the second type of transceiving node are not limited to these specific examples.

Figure 4:
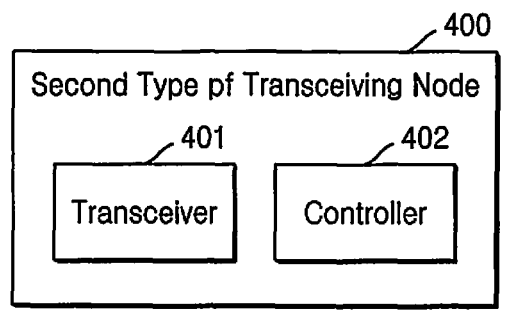
FIG. 4 illustrates a second type of transceiving node according to an embodiment.

FIG. 4 illustrates a second type of transceiving node according to an embodiment.

Referring to FIG. 4, the second type of transceiving node 400 includes a transceiver 401 and a controller 402.

The transceiver 401 may be configured to receive a first type of data and/or a first type of control signal from a first type of transceiving node, and transmit a second type of data and/or a second type of control signal to the first type of transceiving node in a determined time unit.

The controller 402 may include an application specific integrated circuit (ASIC) or at least one processor. The controller 402 may be configured to control the overall operation of the second type of transceiving node and control the second type of transceiving node to implement at least one of the methods of the disclosure. For example, the controller 402 may be configured to determine the second type of data and/or the second type of control signal and a time unit for transmitting the second type of data and/or the second type of control signal based on the first type of data and/or the first type of control signal, and control the transceiver 401 to transmit the second type of data and/or the second type of control signal to the first type of transceiving node in the determined time unit.

The first type of data may be data transmitted by the first type of transceiving node to the second type of transceiving node. In the following examples, downlink data carried by a physical downlink shared channel (PDSCH) is taken as an example (but not limited thereto) to illustrate the first type of data.

Similarly, the second type of data may be data transmitted by the second type of transceiving node to the first type of transceiving node. In the following examples, uplink data carried by a physical uplink shared channel (PUSCH) is taken as an example (but not limited thereto) to illustrate the second type of data.

The first type of control signal may be a control signal transmitted by the first type of transceiving node to the second type of transceiving node. In the following examples, a downlink control signal is taken as an example (but not limited thereto) to illustrate the first type of control signal. The downlink control signal may include downlink control information (DCI) carried by a physical downlink control channel (PDCCH) and/or a control signal carried by a PDSCH.

The second type of control signal may be a control signal transmitted by the second type of transceiving node to the first type of transceiving node. In the following examples, an uplink control signal is taken as an example (but not limited thereto) to illustrate the second type of control signal. The uplink control signal may include uplink control information (UCI) carried by a physical uplink control channel (PUCCH) and/or a control signal carried by a PUSCH. A type of UCI may include HARQ-ACK information, a scheduling request (SR), a link recovery request (LRR), and channel state information (CSI).

A first type of time unit is a time unit in which the first type of transceiving node transmits the first type of data and/or the first type of control signal. In the following examples, a downlink time unit is taken as an example (but not limited thereto) to illustrate the first type of time unit.

Similarly, a second type of time unit is a time unit in which the second type of transceiving node transmits the second type of data and/or the second type of control signaling. In the following examples, an uplink time unit is taken as an example (but not limited thereto) to illustrate the second type of time unit.

The first type of time unit and the second type of time unit may be one or more slots, one or more sub-slots, one or more orthogonal frequence division multiplexing (OFDM) symbols, or one or more subframes.

Depending on the network type, the term "base station" can refer to any component (or collection of components) configured to provide wireless access to a network, such as a transmit point (TP), a transmit-receive point (TRP), an enhanced base station (eNodeB or eNB), a 5G base station (gNB), a macrocell, a femtocell, a WiFi AP, or other wirelessly enabled devices. Base stations may provide wireless access in accordance with one or more wireless communication protocols, e.g., 5G 3GPP NR interface/access, LTE, LTE advanced (LTE-A), high speed packet access (HSPA), Wi-Fi 802.11a/b/g/n/ac, etc. Also, depending on the network type, the term "user equipment" can refer to any component such as a "mobile station", a "subscriber station", a "remote terminal", a "wireless terminal", a "receive point", a "user device", or simply a "terminal". For the sake of convenience, the terms "user equipment" and "UE" are used predominantly herein to refer to a remote wireless equipment that wirelessly accesses a base station, regardless of whether the UE is a mobile device (such as a mobile telephone or smartphone) or is a stationary device (such as a desktop computer or vending machine).

Figure 5:
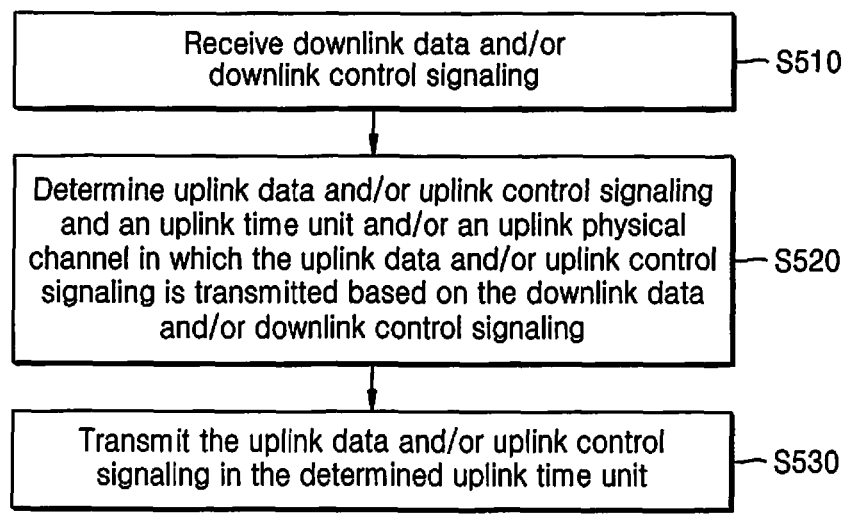
FIG. 5 is a flowchart illustrating a method performed by a UE according to an embodiment.

FIG. 5 is a flowchart illustrating a method performed by a UE according to an embodiment.

Referring to FIG. 5, in step S510, the UE receives downlink data and/or downlink control signaling from a base station.

In step S520, the UE determines uplink data and/or an uplink control signal and an uplink time unit and/or an uplink physical channel in which the uplink data and/or the uplink control signal is transmitted based on the downlink data and/or downlink control signaling.

In step S530, the UE transmits the uplink data and/or uplink control signal to the base station in the determined uplink time unit.

The UE may be configured with two levels of priorities for uplink TX. For example, a first priority may be higher than a second priority. However, the embodiments of the disclosure are not limited to this example, and the UE may be configured with more than two levels of priorities. In the description of the embodiments below, it is assumed that the first priority is higher than the second priority.

The two levels of priorities may be indicated by priority numbers or priority indexes (e.g., priority index 1 and priority index 0). A larger priority index may correspond to a higher priority, i.e., a priority corresponding to priority index 1 may be higher than a priority corresponding to priority index 0. In this case, a larger priority index (e.g., priority index 1) may be a higher priority (e.g., the first priority), and a smaller priority index (e.g., priority index 0) may be a lower priority (e.g., the second priority). However, the embodiments of the disclosure are not limited to this example, and other priority indexes or indicators may be used to indicate the two levels of priorities. In the description below, a priority corresponding to a larger priority index (e.g., priority index 1) is higher than a priority corresponding to a smaller priority index (e.g., priority index 0). In addition, a priority index 1 may be used interchangeably with the first priority, the larger priority index, or the higher priority, and priority index 0 may be used interchangeably with the second priority, the smaller priority index, or the lower priority.

The two levels of priorities configured for the UE may be two physical layer priorities. For example, one of the two levels of priorities (priority index 1 or priority index 0) may be provided for the PUSCH or PUCCH. Specifically, a PUSCH or PUCCH TX (including a TX with repetitions if there is a TX with repetitions) may be of (e.g., correspond to) priority index 0 or a larger priority index (e.g., priority index 1).

For a configured grant PUSCH TX, the UE may determine the priority index according to a parameter of priority (if configured). For a PUCCH TX with HARQ-ACK information corresponding to a semi-persistent scheduling (SPS) PDSCH RX or an SPS PDSCH release, the UE may determine the priority index of the PUCCH TX from a parameter of HARQ-CodebookID (if configured). If no priority index is configured for a certain PUSCH or PUCCH TX of the UE, the priority index of the PUSCH or PUCCH TX may be 0.

If the UE monitors a PDCCH to detect DCI format 0_1 and DCI format 1_1 or to detect DCI format 0_2 and DCI format 1_2 in an active downlink (DL) bandwidth part (BWP), the priority index may be provided by a priority indicator field. If the UE indicates that it has the capability to monitor the PDCCH in the active DL BWP to detect DCI format 0_1 and DCI format 1_1 and to detect DCI format 0_2 and DCI format 1_2, DCI format 0_1 or DCI format 0_2 may schedule a PUSCH TX with any priority, and DCI format 1_1 or DCI format 1_2 may schedule a PDSCH RX and trigger a PUCCH TX of corresponding HARQ-ACK information with any priority.

The UE may be configured with a PUCCH configuration list, which may include two PUCCH configurations, including a first PUCCH configuration and a second PUCCH configuration. For example, the first PUCCH configuration may correspond to the second priority (e.g., priority index 0). Similarly, the second PUCCH configuration may correspond to the first priority (e.g., priority index 1).

A sub-slot configuration length of each PUCCH configuration of the first PUCCH configuration and the second PUCCH configuration may be 7 OFDM symbols or 2 OFDM symbols. Sub-slot configuration lengths of different PUCCH configurations may be configured separately.

The UE may be configured with a pdsch-HARQ-ACK-CodebookList. For example, the pdsch-HARQ-ACK-CodebookList may include two pdsch-HARQ-ACK-Codebook configurations, including a first HARQ-ACK codebook and a second HARQ-ACK codebook. For example, the first HARQ-ACK codebook is associated with a PUCCH with the smaller priority index (e.g., priority index 0), and the second HARQ-ACK codebook is associated with a PUCCH with the larger priority index (e.g., priority index 1). In this case, the priority of the first HARQ-ACK codebook is the second priority (e.g., the smaller priority index),' and the priority of the second HARQ-ACK codebook is the first priority (e.g., the larger priority index).

The first priority or higher priority (e.g., priority index 1) may correspond to a first service (e.g., a URLLC service), and the second priority or lower priority (e.g., priority index 0) may correspond to a second service (e.g., an eMBB service).

When a plurality of UCIs with different priorities are multiplexed in a same PUCCH or PUSCH TX, how to determine physical resources occupied by UCIs with respective priorities and how to map UCI information to the physical resources for TX is a problem to be solved. For example, a specific problem is whether a plurality of UCIs with different priorities are to be separately encoded (e.g., channel coded), and in which scenarios the plurality of UCIs with different priorities are to be separately encoded.

In accordance with an embodiment of the disclosure, when a plurality of UCIs are separately encoded, each of the plurality of UCIs is separately encoded. However, when the plurality of UCIs are jointly encoded, the plurality of UCIs are encoded as a whole.

At least one of the following approaches (Approach a-1 through Approach a-4) may be adopted to determine whether the plurality of UCIs with different priorities are to be separately encoded.

Different UCI types with the same priority may be jointly encoded, or different UCI types with the same priority may be separately encoded. For example, different UCI types with the same priority may be jointly encoded when transmitted in the PUCCH. More specifically, a HARQ-ACK with the higher priority and an SR with the higher priority may be jointly encoded. As another example, different UCI types with the same priority may be separately encoded when transmitted in the PUSCH. More specifically, a HARQ-ACK with the higher priority, Part 1 CSI with the higher priority, and Part 2 CSI with the higher priority may be separately encoded.

Approach a-1: semi-statically configuring whether the plurality of UCIs with different priorities are to be separately encoded by higher layer signaling. The higher layer signaling may include radio resource control (RRC) signaling and/or media access control (MAC) signaling. For example, the UE may be notified or indicated, by the base station, through the higher layer signaling, that the plurality of UCIs with different priorities are to be separately encoded.

Approach a-2: dynamically indicating whether the plurality of UCIs with different priorities are separately encoded by physical layer signaling. For example, the UE may be notified or indicated, by the base station, through physical layer signaling, that the plurality of UCIs with different priorities are to be separately encoded.

Approach a-3: determining whether the plurality of UCIs with different priorities are separately encoded through a capability reported by UE.

For example, the UE may report, to the base station, a maximum number (or number of times) A0 that can be separately encoded in the PUCCH, where A0 may be a positive integer. For example, A0 may be equal to 1, 2, 3, or 4. Based on the maximum number A0 reported by the UE, the base station may determine whether the UE supports separately encoding a plurality of UCIs with different priority indexes in the PUCCH, and indicate to the UE whether the plurality of UCIs with different priorities are to be separately encoded according to the determination.

The UE may report, to the base station, whether it supports separately encoding the plurality of UCIs with different priority indexes in the PUCCH. Based on the reporting by the UE, the base station may determine whether the UE supports separately encoding the plurality of UCIs with different priority indexes in the PUCCH, and indicate to the UE whether the plurality of UCIs with different priorities are to be separately encoded according to the determination.

Approaches a-1 to a-3 may perform configuring/indicating/UE capability reporting individually for PUSCHs/PUCCHs with different priorities, or Approaches a-1 to a-3 may perform configuring/indicating/UE capability reporting collectively for PUSCH/PUCCH with different priorities.

Approaches a-1 to a-3 may perform configuring/indicating/UE capability reporting individually for semi-statically configured PUSCH and dynamically scheduled PUSCH, or Approaches a-1 to a-3 may perform configuring/indicating/UE capability reporting uniformly for a semi-statically configured PUSCH and a dynamically scheduled PUSCH.

Approaches a-1 to a-3 may perform configuring/indicating/UE capability reporting individually for a semi-statically configured PUCCH and a dynamically scheduled PUCCH, or Approaches a-1 to a-3 may perform configuring/indicating/UE capability reporting collectively for a semi-statically configured PUCCH and a dynamically scheduled PUCCH.

Approach a-4: determining whether the plurality of UCIs with different priorities are separately encoded by predefined rules. For example, the UE may determine that the plurality of UCIs with different priorities are to be separately encoded according to predefined rules. By further clarifying the behavior of the UE based on the predefined rules, erroneous scheduling may be excluded and complexity of UE implementation may be reduced.

The predefined rules may include at least one of Rules b-1 to b-7 below.

Rule b-1: determining whether the plurality of UCIs are to be separately encoded according to the priority of a PUCCH or a PUSCH carrying the plurality of UCIs with different priorities. The priority of the PUCCH or the PUSCH may be a priority index. For example, in one of the following cases, it is determined that the plurality of UCIs with different priorities are to be separately encoded: the priority index of the PUCCH or the PUSCH carrying the plurality of UCIs is 1; or, the priority index of the PUCCH or PUSCH carrying the plurality of UCIs is 0.

The priority of the PUCCH may be the priority of PUCCH resource. For example, if the UE is configured with the PUCCH configuration list including two PUCCH configurations (the first PUCCH configuration and the second PUCCH configuration), the priority index of a PUCCH resource in the first PUCCH configuration may be 0, and the priority index of a PUCCH resource in the second PUCCH configuration may be 1. As another example, if the UE is configured with a first SPS-PUCCH-AN-List and a second SPS-PUCCH-AN-List, the priority index of a PUCCH resource in the first SPS-PUCCH-AN-List may be 0, and the priority index of a PUCCH resource in the second SPS-PUCCH-AN-List may be 1.

The priority (e.g., priority index) of the PUSCH may be the priority (e.g., priority index) of uplink data.

Rule b-2: determining whether the plurality of UCIs are to be separately encoded according to code rates and the number of physical resources of the plurality of UCIs with different priorities. For example, the physical resources may include resource elements (REs) and/or resource blocks (RBs).

The number of REs and/or RBs may be counted according to a code rate of UCI(s) with the higher priority and a total number of bits of the UCIs. For example, when the counted number of REs and/or RBs exceeds the number of REs and/or RBs available for the PUCCH and/or the PUSCH, it is determined that the plurality of UCIs with different priorities are to be separately encoded.

A sum of the numbers of REs and/or a sum of the numbers of RBs may be counted according to code rates of UCIs with respective priorities and numbers of bits of the UCIs with respective priorities. For example, when the counted sum of the numbers of REs and/or sum of the numbers of RBs does not exceed the number of REs and/or RBs available for the PUCCH and/or PUSCH, it is determined that the plurality of UCIs with different priorities are to be separately encoded. When the counted sum of the numbers of REs and/or sum of the numbers of RBs exceeds the number of REs and/or RBs available for the PUCCH and/or PUSCH, only UCI(s) with the higher priority may be transmitted, without transmitting UCI(s) with the lower priority.

Rule b-3: determining whether the plurality of UCIs are to be separately encoded according to the number of bits of at least one UCI of the plurality of UCIs with different priorities.

It may be determined that the plurality of UCIs with different priorities are to be separately encoded according to a ratio between numbers of bits of UCIs with different priorities. For the convenience of description, two UCIs (first UCI and second UCI) are taken as examples for illustrating below, in which the first UCI is of the higher priority (e.g., priority index 1), corresponding to the first service (e.g., the URLLC service), and the second UCI is of the lower priority (e.g., priority index 0), corresponding to the second service (e.g., the eMBB service).

It may be determined that the plurality of UCIs with different priorities are to be separately encoded in one of the following cases:
  the number of bits of the first UCI (e.g., with the larger priority index (e.g., priority index 1)) divided by the number of bits of the second UCI (e.g., with the smaller priority index (e.g., priority index 0)) is larger than or equal to N1;
  the number of bits of the first UCI divided by the number of bits of the second UCI is less than or equal to N2;
  the number of bits of UCI with the smaller priority index divided by the number of bits of UCI with the larger priority index is larger than or equal to N3.
  the number of bits of the UCI with the smaller priority index divided by the number of bits of the UCI with the larger priority index is less than or equal to N4.

N1, N2, N3, and N4 may be real numbers larger than 0. N1, N2, N3, and N4 may be specified for example by technical specifications or configured by higher layer signaling.

Whether the plurality of UCIs are to be separately encoded may be determined according to the number of bits of one UCI of the plurality of UCIs with different priorities. For example, it may be determined that the plurality of UCIs with different priorities are to be separately encoded in one of the following cases:

the number of bits of UCI with the higher priority (e.g., priority index 1) is larger than or equal to M1;
the number of bits of the UCI with the higher priority is less than or equal to M2;
the number of bits of UCI with the lower priority (e.g., priority index 0) is larger than or equal to M3; or
the number of bits of the UCI with the lower priority is less than or equal to M4.

M1, M2, M3, and M4 may be integers larger than 0. M1, M2, M3, and M4 may be specified for example by technical specifications or configured by higher layer signaling.

Whether the plurality of UCIs are to be separately encoded may be determined according to the number of bits of UCI of the plurality of UCIs with different priorities. For example, it may be determined that the plurality of UCIs with different priorities are to be separately encoded in one of the following cases:

the number of bits of the UCI with the lower priority (e.g., priority index 0) is less than or equal to M4 and the number of bits of the UCI with the higher priority (e.g., priority index 1) is larger than or equal to M1;
the number of bits of the UCI with the lower priority is less than or equal to M4 and the number of bits of the UCI with the higher priority is less than or equal to M2;
the number of bits of the UCI with the lower priority is larger than or equal to M3 and the number of bits of the UCI with the higher priority is larger than or equal to M1; or
the number of bits of the UCI with the lower priority is larger than or equal to M3 and the number of bits of the UCI with the higher priority is less than or equal to.

As described above, M1, M2, M3, and M4 may be integers larger than 0. M1, M2, M3, and M4 may be specified for example by technical specifications or configured by higher layer signaling.

Rule b-4: determining whether the plurality of UCIs are to be separately encoded according to a coding type adopted by at least one UCI of the plurality of UCIs with different priorities.

For example, when the number of bits of each UCI of the plurality of UCIs with different priorities is larger than 2 and less than or equal to 11, i.e., when Reed-Muller (RM) coding is adopted, it may be determined that the plurality of UCIs are to be separately encoded.

When the number of bits of UCI with the lower priority (e.g., priority index 0) among the plurality of UCIs is larger than 2 and less than or equal to 11, it may be determined that the plurality of UCIs are to be separately encoded.

When the number of bits of UCI with the higher priority (e.g., priority index 1) among the plurality of UCIs is larger than 2 and less than or equal to 11, it may be determined that the plurality of UCIs are to be separately encoded.

When the number of bits of each UCI of the plurality of UCIs with different priorities is larger than 11, it may be determined that the plurality of UCIs are to be separately encoded.

In accordance with the above-described embodiments, by determining whether to adopt separate encoding for different types of coding, performance of UCI TX is further optimized.

Rule b-5: determining whether the plurality of UCIs are to be separately encoded according to the number of cyclic redundancy check (CRC) bits corresponding to the plurality of UCIs with different priorities.

It is assumed that the number of the CRC bits is Q1 when the UCI with the lower priority (e.g., priority index 0) is separately encoded, the CRC is Q2 when the UCI with the higher priority (e.g., priority index 1) is separately encoded, and the CRC is Q3 when the UCI with the lower priority and the UCI with the higher priority are encoded together.

Q1, Q2, and Q3 may be non-negative integers.

For example, it may be specified that when Q3 is larger than Q1 and/or Q3 is larger than Q2, the plurality of UCIs with different priorities are separately encoded.

As another example, it may be specified that when Q1+Q2-Q3 is larger than or equal to R1, the plurality of UCIs with different priorities are separately encoded.

As another example, it may be specified that when Q1+Q2-Q3 is less than or equal to R2, the plurality of UCIs with different priorities are separately encoded.

R1 and R2 may be non-negative integers. Values of R1 and R2 may be specified by technical specifications or configured by higher layer signaling.

In accordance with the above-described embodiments, by determining whether to adopt separate encoding according to the number of CRC bits, the total number of the CRC bits may be reduced and spectrum efficiency may be improved.

Rule b-6: determining whether the plurality of UCIs with different priorities are to be separately encoded according to a HARQ-ACK codebook type. For example, the HARQ-ACK codebook type configured for the UE may include a semi-static codebook (e.g., type-1 codebook in the technical specification 3GPP TS 38.213) or a dynamic codebook (e.g., type-2 codebook in the technical specification 3GPP TS 38.213). It may be determined whether the plurality of UCIs with different priorities are to be separately encoded according to the HARQ-ACK codebook type configured for the UE.

For example, it is determined whether the plurality of UCIs with different priorities are to be separately encoded in one of the following cases:

a HARQ-ACK codebook type of the first HARQ-ACK codebook (e.g., with the smaller priority index (e.g., priority index 0)) is a semi-static codebook; or
a HARQ-ACK codebook type of the first HARQ-ACK codebook is a dynamic codebook.

Rule b-7: for the plurality of UCIs with different priorities, determining whether the plurality of UCIs are to be separately encoded according to whether a maximum code rate of one UCI of the plurality of UCIs is configured in a PUCCH resource corresponding to the priority of another UCI of the plurality of UCIs.

For example, when a maximum code rate of UCI with the lower priority (e.g., priority index 0) is configured in a PUCCH resource with the higher priority (e.g., priority index 1), it may be determined that the plurality of UCIs are to be separately encoded.

As another example, when a maximum code rate of UCI with the higher priority is configured in a PUCCH resource with the lower priority, it may be determined that the plurality of UCIs are to be separately encoded.

In accordance with the above-described embodiments of the disclosure, a variety of approaches are provided to determine whether UCIs with different priorities are separately encoded, including determining according to at least one of a plurality of predefined rules (Rules b-1 to b-7). By adopting specific methods in different scenarios to determine that UCIs are to be separately encoded, flexibility of network scheduling may be improved while ensuring reliability of high-priority service TX, and spectrum utilization rate may be improved.

Although it is only described in some embodiments that UCIs with different priorities are determined to be separately encoded, those skilled in the art will be able to determine that the UCIs with different priorities are not separately encoded according to the various embodiments described above. For example, when the conditions described in at least one of Rules b-1 to b-7 are not satisfied, it may be determined that the UCIs with different priorities are not separately encoded.

In accordance with the embodiments of the disclosure, if it is determined that the UCIs with different priorities are not separately encoded, the UCI with different priorities may be jointly encoded, or only UCI with the higher priority may be transmitted and UCI with the lower priority may be dropped (or ignored or not transmitted); or the UCI with the lower priority (e.g., HARQ-ACK(s) with the lower priority) may be compressed/bundled and the compressed/bundled UCI may be jointly encoded with UCI with the higher priority.

Alternatively, it may be determined that the UCI with the lower priority (e.g., HARQ-ACK with the lower priority) is compressed/bundled and the compressed/bundled UCI is jointly encoded with the UCI with the higher priority according to the conditions described in at least one of Rules b-1 to b-7. For example, "determining that the plurality of UCIs with different priorities are to be separately encoded" may include or be replaced by "determining that the UCI with the lower priority (e.g., HARQ-ACK with the lower priority) is compressed/bundled and the compressed/bundled UCI is jointly encoded with the UCI(s) with the higher priority".

Alternatively, it may be determined that only the UCI with the higher priority is transmitted and the UCI with the lower priority is dropped (or ignored or not transmitted) according to the conditions described in at least one of Rules b-1 to b-7. For example, "determining that the plurality of UCIs with different priorities are to be separately encoded" may include or be replaced by "determining that only the UCI with the higher priority is transmitted and the UCI with the lower priority is dropped (or ignored or not transmitted)".

In accordance with the above-described embodiments of the disclosure, it is possible to further clarify behaviors of the UE based on the predefined rules, exclude erroneous scheduling, and reduce complexity of UE implementation.

In accordance with the above-described embodiments of the disclosure, whether to adopt separate encoding for different types of coding may be determined, so that performance of UCI TX may be further optimized.

In accordance with the above-described embodiments of the disclosure, whether to adopt separate encoding may be determined according to the number of CRC bits, which may reduce the total number of the CRC bits and improve spectrum efficiency.

When a plurality of UCIs with different priorities are separately encoded, how to determine a maximum code rate of each of the plurality of UCIs is also a problem to be solved. Accordingly, a method according to an embodiment is provided below for determining maximum code rates for the UCI with respective priorities.

In the following description, various embodiments of a method for determining maximum code rates of UCIs with respective priorities when using a PUCCH TX will be illustrated by taking two levels of priorities (e.g., priority indexes) as examples. However, the embodiments described below may also be applicable to scenarios with more than two levels of priority indexes, and these embodiments may also be applicable to scenarios in which a PUSCH TX is used. The methods for determining maximum code rates of UCI with respective priorities in these embodiments described below may also be applicable to determine modulation orders of the UCI with respective priorities.

As described above, a UE may be configured with a PUCCH configuration list, which may include two PUCCH configurations, i.e., the first PUCCH configuration and the second PUCCH configuration. The priority of the first PUCCH configuration may be the lower priority (e.g., priority index 0), and the priority of the second PUCCH configuration may be the higher priority (e.g., priority index 1). For each PUCCH configuration of the first PUCCH configuration and the second PUCCH configuration, the base station will configure a maximum code rate of the PUCCH for a plurality of PUCCH formats (e.g., PUCCH format 1, PUCCH format 2, PUCCH format 3, and PUCCH format 4), respectively. Therefore, a plurality of PUCCH formats in the first PUCCH configuration may be of the lower priority and a plurality of PUCCH formats in the second PUCCH configuration may be of the higher priority. At least one of the following approaches (Approaches c-1 to c-4) may be adopted to determine a maximum code rate of each UCI of the plurality of UCI.

Approach c-1: when the plurality of UCI are transmitted in a PUCCH format corresponding to the priority (e.g., priority index) of one UCI of the plurality of UCI, for another UCI of the plurality of UCI, determining a maximum code rate of the other UCI according to a maximum code rate configured in a PUCCH format corresponding to the priority (e.g., priority index) of the other UCI of the plurality of UCI.

For the convenience of description, two UCI (the first UCI and the second UCI) are taken as examples, in which the first UCI is of the higher priority (e.g., priority index 1) and the second UCI is of the lower priority (e.g., priority index 0). When the first UCI and the second UCI are transmitted in PUCCH format x in the second PUCCH configuration with the higher priority, a maximum code rate of a UCI with the lower priority (e.g., the second UCI) may be determined to be a maximum code rate configured in PUCCH format x in the first PUCCH configuration, and a maximum code rate of a UCI with the higher priority (e.g., the first UCI) may be determined to be a maximum code rate configured in PUCCH format x in the second PUCCH configuration. When the first UCI and the second UCI are transmitted in PUCCH format x in the first PUCCH configuration with the lower priority, a maximum code rate of a UCI with the higher priority (e.g., the first UCI) may be determined to be a maximum code rate configured in PUCCH format x in the second PUCCH configuration, and a maximum code rate of a UCI with the lower priority (e.g., the second UCI) may be determined to be a maximum code rate configured in PUCCH format x in the first PUCCH configuration. In the PUCCH format x, x may be 1, 2, 3, or 4.

Approach c-2: when the plurality of UCI are transmitted in a PUCCH format corresponding to the priority (e.g., priority index) of one UCI of the plurality of UCI, for another UCI of the plurality of UCI with different priorities, determining a maximum code rate of the other UCI according to a maximum code rate configured in a PUCCH format corresponding to the priority of the one UCI of the plurality of UCIs, and an offset.

For the convenience of description, two UCI (i.e., the first UCI and the second UCI) are taken as examples, in which the first UCI is of the higher priority (e.g., priority index 1) and the second UCI is of the lower priority (e.g., priority index 0).

The base station may configure offsets for different PUCCH formats, or may configure the same offset for different PUCCH formats.

When the first UCI and the second UCI are transmitted in PUCCH format x with the higher priority (e.g., priority index 1), a maximum code rate of a UCI with the lower priority (e.g., priority index 0) (e.g., the second UCI) may be determined to be a value obtained by adding or subtracting an offset to or from a maximum code rate configured in PUCCH format x with the higher priority. When the first UCI and the second UCI are transmitted in PUCCH format x with the lower priority, a maximum code rate of a UCI with the higher priority (e.g., the first UCI) may be determined to be a value obtained by adding or subtracting an offset to or from a maximum code rate configured in PUCCH format x with the lower priority.

For certain PUCCH formats, the base station may configure an offset, or the base station may configure an offset for different priorities, respectively. For example, the offset may be a relative value.

When the offset is the relative value, a maximum code rate of a UCI with the lower priority (e.g., priority index 0) (e.g., the second UCI) may be determined to be a value obtained by multiplying or dividing a maximum code rate configured in PUCCH format x with the higher priority (e.g., priority index 1) by the offset, when the first UCI and the second UCI are transmitted in PUCCH format x with the higher priority. When the first UCI and the second UCI are transmitted in PUCCH format x with the lower, a maximum code rate of UCI with the higher priority (e.g., the first UCI) may be a value obtained by multiplying or dividing a maximum code rate configured in PUCCH format x with the lower priority by the offset.

Approach c-3: for UCI of the plurality of UCI with different priorities, determining the maximum code rate of the UCI according to another maximum code rate parameter configured by the base station for the PUCCH format.

For the convenience of description, the "another maximum code rate" may be referred to as an additional maximum code rate, so as to distinguish it from a maximum code rate (e.g., a parameter maxCodeRate) configured in an existing PUCCH format. The "additional maximum code rate" configured in the PUCCH format may be used for UCI of which the priority is different from that of the PUCCH format.

The base station may respectively configure additional maximum code rate parameters for different PUCCH formats respectively, or the base station may also configure the same additional maximum code rate parameter for different PUCCH formats. For example, additional maximum code rate parameters may be configured for different PUCCH formats in the 3GPP parameter PUCCH-FormatConfig. As another example, a same additional maximum code rate parameter may be configured for different PUCCH formats in the 3GPP parameter PUCCH-Config.

For the convenience of description, the first UCI and the second UCI are taken as examples, in which the first UCI is of the higher priority (e.g., priority index 1) and the second UCI is of the lower priority (e.g., priority index 0).

In When the first UCI and the second UCI are transmitted in PUCCH format x with the higher priority, a maximum code rate of a UCI with the lower priority (e.g., the second UCI) may be determined to be an additional maximum code rate configured in PUCCH format x with the higher priority. When the first UCI and the second UCI are transmitted in PUCCH format x with the lower priority, a maximum code rate of a UCI with the higher priority (e.g., the first UCI) may be determined to be an additional maximum code rate configured in PUCCH format x with the lower priority.

Approach c-4: when the plurality of UCI are transmitted in a PUCCH format corresponding to the priority (e.g., the priority index) of one UCI of the plurality of UCI, for another UCI of the plurality of UCI, a maximum code rate of the other UCI is determined according to a maximum code rate configured in a PUCCH resource (e.g., the PUCCH resource carrying the other UCI) corresponding to the priority (e.g., the priority index) of the other UCI of the plurality of UCI.

For the convenience of description, the first UCI and the second UCI are taken as examples, in which the first UCI has the higher priority (e.g., priority index 1) and the second UCI is of the lower priority (e.g., priority index 0).

When the first UCI and the second UCI are transmitted in PUCCH format y in the second PUCCH configuration with the higher priority, a maximum code rate of a UCI with the lower priority (e.g., the second UCI) may be determined to be a maximum code rate of the PUCCH resource carrying the UCI with the lower priority (e.g., the second UCI).

It may also be specified that if PUCCH format z of the PUCCH resource carrying the UCI with the lower priority (e.g., the second UCI) is the same as PUCCH format y of the PUCCH resource carrying multiplexed UCI (e.g., the first UCI and the second UCI), a maximum code rate of the UCI with the lower priority (e.g., the second UCI) may be determined to be a maximum code rate of the PUCCH resource carrying the UCI with the lower priority (e.g., the second UCI). Otherwise, a maximum code rate of the UCI with the lower priority may be determined according to the method specified in other embodiments of the disclosure.

In PUCCH format y, y may be 1, 2, 3, or 4. In PUCCH format z, z may be 1, 2, 3, or 4.

In accordance with the above-described embodiments, various approaches are provided to determine maximum code rates of UCIs with respective priorities. As described above, maximum code rates actually used for the UCI with the respective priorities may be determined based on a configured maximum code rate. Approach c-1 reuses an existing parameter configuration and thus reduces overhead of higher layer signaling. Approach c-2 and Approach c-3 clarify a highest code rate when the UCI with respective priorities are multiplexed by an additional parameter configuration, which may increase flexibility of scheduling and improve reliability of UCI TX.

Approach c-4 provides a method for determining a maximum code rate of one UCI of the plurality of UCI when the plurality of UCI are transmitted in a PUCCH format corresponding to the priority of another UCI of the plurality of UCI. By this approach, it is convenient for the UE to determine a maximum code rate for carrying another UCI, thereby reducing overhead of higher layer signaling and ensuring reliability of UCI TX with the lower priority.

If a PUCCH resource or PUCCH format is configured with two maximum code rate parameters (including the additional maximum code rate parameter and the maximum code rate (e.g., the parameter maxCodeRate) configured in the existing PUCCH format) (or configured with additional maximum code rate parameters), maximum code rates corresponding to UCI with different priorities are determined according to Approach c-3. Otherwise, if the PUCCH resource or PUCCH format is not configured with the two maximum code rate parameters (or is not configured with the additional maximum code rate parameter, e.g., only configured with the maximum code rate (e.g., the parameter maxCodeRate) in the existing PUCCH format), the maximum code rates corresponding to the UCI with different priorities are determined according to Approach c-1 and/or Approach c-2. For example, the UCI may be HARQ-ACK.

A maximum code rate of the second UCI transmitted in a PUCCH resource or PUCCH format with the first priority is a maximum code rate by multiplying or dividing a maximum code rate of a PUCCH resource or PUCCH format with the second priority by a parameter, if a modulation order of a PUCCH resource or PUCCH format with the first priority is different from that of a PUCCH resource or PUCCH format with the second priority. This parameter may be a fixed value, e.g., 2, 1, or 0.5. This parameter may be obtained by dividing the modulation order of the PUCCH resource or PUCCH format with the second priority by the modulation order of the PUCCH resource or PUCCH format with the first priority. This parameter may be obtained by dividing the modulation order of the PUCCH resource or PUCCH format with the first priority by the modulation order of the PUCCH resource or PUCCH format with the second priority. This parameter may also be configured by higher layer signaling or specified by protocols.

It may be specified by protocols, that if modulation orders of a PUCCH with the first priority and a PUCCH with the second priority overlapping in time domain are different, the UE transmits the PUCCH with the first priority, and the UE does not transmit the PUCCH with the second priority. Alternatively, it may be specified by the protocols that the UE does not expect modulation orders of two PUCCHs with different priorities overlapping in time domain to be different. It may be specified by the protocols that the UE does not expect modulation orders of two PUCCHs carrying HARQ-ACK with different priorities overlapping in time domain to be different.

It may be specified by the protocols that, if HARQ-ACK with different priorities may be multiplexed in a PUCCH, the UE does not expect a modulation order of the same PUCCH format with different priorities to be different.

It may be specified by the protocols that a PUCCH format with the first priority of the PUCCH with the first priority and the PUCCH with the second priority overlapping in time domain is PUCCH format x, if modulation orders of PUCCH format x with different priorities are different, the UE transmits the PUCCH with the first priority, and the UE does not transmit the PUCCH with the second priority.

It may be specified by the protocols that modulation orders of UCIs that are separately encoded in a PUCCH may be different. The UE determines REs on which respective UCI are mapped based on the modulation orders and maximum code rates of respective UCI.

In accordance with an embodiment of the disclosure, the method specifies an approach of whether to multiplex UCI with different priorities and determining a maximum code rate of the UCI with different priorities when modulation orders of PUCCHs with different priorities are different. Frequency spectrum efficiency of PUCCH resources is improved, performance of the system is improved, behavior of the UE is clarified, and reliability of the network is improved.

When a plurality of UCI with different priorities are jointly encoded, the number of physical resource blocks (PRBs) for a PUCCH TX may be determined according to the method in the technical specification 3GPP TS38.213, and then RE mapping may be performed according to the method in the technical specification 3GPP TS38.212. When the plurality of UCI with different priorities are separately encoded, after determining a maximum code rate of the UCI with different priorities, the number of the PRBs for the PUCCH TX and the mode for RE mapping must still be determined.

In accordance with an embodiment of the disclosure, when the plurality of UCI are separately encoded, each of the plurality of UCI is separately encoded. However, when the plurality of UCI are jointly encoded, the plurality of UCI are encoded as a whole. Alternatively, only UCI with the higher priority may be transmitted and UCI with the lower priority may be dropped (or ignored or not transmitted). UCI with the lower priority (e.g., HARQ-ACK with the lower priority) may be compressed/bundled and the compressed/bundled UCI may be jointly encoded with UCI with the higher priority.

Some examples of the number of the PRBs for the PUCCH TX and the mode for RE mapping when the plurality of UCIs with different priorities are separately encoded are described in Approaches d-1 and d-2 below.

Approach d-1: determining the number of PRBs of each UCI according to the plurality of UCI with different priorities (e.g., priority indexes) and corresponding maximum code rates respectively, and performing RE mapping based on at least one determined number of the PRBs of each UCI.

The number of the PRBs may be determined first (e.g., according to the method in the technical specification 3GPP TS38.213), and then the RE mapping may be performed (e.g., according to the method in the technical specification 3GPP TS 38.212). A total number of PRBs is a sum of numbers of PRBs of UCI with respective priorities.

Two UCI (i.e., the first UCI and the second UCI) and types of both the UCI being HARQ-ACK are taken as examples. In this case, UCI include first HARQ-ACK information (e.g., with the high priority (e.g., priority index 1) and second HARQ-ACK information (e.g., with the lower priority (e.g., priority index 0)).

When PUCCH format 2 or PUCCH format 3 is used, the UE may determine the number of PRBs, $M_{RB,\,min}^{PUCCH}$, for TX using Equation (1):

$$\min\left(\left\lceil \frac{(O_{ACK}^0 + O_{CRC}^0)}{N_{sc,ctrl}^{RB} \cdot N_{symb-UCI}^{PUCCH} \cdot Q_m \cdot r^0} \right\rceil + \left\lceil \frac{(O_{ACK}^1 + O_{CRC}^1)}{N_{sc,ctrl}^{RB} \cdot N_{symb-UCI}^{PUCCH} \cdot Q_m \cdot r^1} \right\rceil, M_{RB}^{PUCCH}\right) \quad (1)$$

In Equation (1), $O_{ACK}^0$ is the number of bits of the second HARQ-ACK information, and $O_{CRC}^0$ is the number of bits of the CRC for the second HARQ-ACK information; $O_{ACK}^1$ is the number of bits of the first HARQ-ACK, and $P_{CRC}^1$ is the number of bits of the CRC for the first HARQ-ACK; $M_{RM}^{PUCCH}$ is the number of PRBs configured for PUCCH format 2 or PUCCH format 3; $N_{sc,\,ctrl}^{RB}$ is the number of subcarriers of a PRB that are available for TX of UCI; $N_{symb-UCI}^{PUCCH}$ is the number of OFDM symbols available for TX of UCI; $Q_m$ is the modulation order; $r^0$ is the maximum code rate for the second UCI (the second HARQ- ACK information); and $r^1$ is the maximum code rate for the first UCI (the first HARQ-ACK information).

The symbol $\lceil \cdot \rceil$ may express a ceiling operator, and min may express taking a minimum value $$\left\lceil \frac{(O^0_{ACK} + O^0_{CRC})}{N^{RB}_{sc,ctrl} \cdot N^{PUCCH}_{symb-UCI} \cdot Q_m \cdot r^0} \right\rceil$$

may correspond to the number of PRBs for TX of the second HARQ-ACK, which is determined based on the number of bits of the second HARQ-ACK information and a corresponding maximum code rate (i.e., the maximum code rate of the second HARQ-ACK information), and $$\left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil$$

may correspond to the number of PRBs for TX of the first HARQ-ACK information, which is determined based on the number of bits of the first HARQ-ACK information and a corresponding maximum code rate (i.e., the maximum code rate of the first HARQ-ACK information).

For PUCCH format 3, if $M_{RB,min}^{PUCCH}$ is not equal to $2^{\alpha_2} \cdot 3^{\alpha_3} \cdot 5^{\alpha_5}$, $M_{RB,min}^{PUCCH}$ should be increased to a closest value of $2^{\alpha_2} \cdot 3^{\alpha_3} \cdot 5^{\alpha_5}$, where valid values of $2^{\alpha_2} \cdot 3^{\alpha_3} \cdot 5^{\alpha_5}$ may be specified by protocols and/or configured by higher layer signaling (e.g., the 3GPP parameter nrofPRBs), and $\alpha_2$, $\alpha_3$, and $\alpha_5$ are non-negative integers. For PUCCH format 3, the second HARQ-ACK information may be mapped on $$\left\lceil \frac{(O^0_{ACK} + O^0_{CRC})}{N^{RB}_{sc,ctrl} \cdot N^{PUCCH}_{symb-UCI} \cdot Q_m \cdot r^0} \right\rceil PRBs.$$

The first HARQ-ACK information may be mapped on $$M^{PUCCH}_{RB,min} - \left\lceil \frac{(O^0_{ACK} + O^0_{CRC})}{N^{RB}_{sc,ctrl} \cdot N^{PUCCH}_{symb-UCI} \cdot Q_m \cdot r^0} \right\rceil PRBs.$$

Alternatively, the first HARQ-ACK information may be mapped on $$\left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil PRBs,$$

and then the second HARQ-ACK information may be mapped on $$M^{PUCCH}_{RB,min} - \left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil PRBs.$$

For example, PRB indexes of the PRBs to which the second HARQ-ACK information is mapped may be smaller than PRB indexes of the PRBs to which the first HARQ-ACK information is mapped. As another example, PRB indexes of the PRBs to which the second HARQ-ACK information is mapped may be larger than PRB indexes of the PRBs to which the first HARQ-ACK information is mapped.

For example, when $$\left\lceil \frac{(O^0_{ACK} + O^0_{CRC})}{N^{RB}_{sc,ctrl} \cdot N^{PUCCH}_{symb-UCI} \cdot Q_m \cdot r^0} \right\rceil + \left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil \leq M^{PUCCH}_{RB},$$

the first HARQ-ACK information may be mapped on $$\left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil PRBs,$$

and then the second HARQ-ACK information may be mapped on $$\left\lceil \frac{(O^0_{ACK} + O^0_{CRC})}{N^{RB}_{sc,ctrl} \cdot N^{PUCCH}_{symb-UCI} \cdot Q_m \cdot r^0} \right\rceil PRBs.$$

As another example, when $$\left\lceil \frac{(O^0_{ACK} + O^0_{CRC})}{N^{RB}_{sc,ctrl} \cdot N^{PUCCH}_{symb-UCI} \cdot Q_m \cdot r^0} \right\rceil + \left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil > M^{PUCCH}_{RB},$$

the first HARQ-ACK information may be mapped on $$\left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil PRBs,$$

and then the second HARQ-ACK information may be mapped on $$M^{PUCCH}_{RB} - \left\lceil \frac{(O^1_{ACK} + O^1_{CRC})}{N^{RB}_{sc,ctrl} \cdot N^{PUCCH}_{symb-UCI} \cdot Q_m \cdot r^1} \right\rceil PRBs.$$

When the RE mapping is performed, UCI with the higher priority (e.g., priority index 1) may be mapped preferentially, and then UCI with the lower priority (e.g., priority index 0) may be mapped.

Modulation orders of the first UCI and the second UCI are the same in this example. However, if the modulation orders of the first UCI and the second UCI are different, when PUCCH format 2 or PUCCH format 3 is used, the UE may determine that the number of PRBs for TX $M^{PUCCH}_{RB,min}$ may be replaced by Equation (1):

$$\min\left(\left\lceil \frac{(O^0_{ACK} + O^0_{CRC})}{N^{RB}_{sc,ctrl} \cdot N^{PUCCH}_{symb-UCI} \cdot Q^0_m \cdot r^0} \right\rceil + \left\lceil \frac{(O^1_{ACK} + O^1_{CRC})}{N^{RB}_{sc,ctrl} \cdot N^{PUCCH}_{symb-UCI} \cdot Q^1_m \cdot r^1} \right\rceil, M^{PUCCH}_{RB}\right) \quad (2)$$

In Equation (2), $Q_m^0$ is the modulation order of the second UCI (e.g., the second HARQ-ACK information); $Q_m^1$ is the modulation order of the first UCI (e.g., the first HARQ-ACK information); and definitions of other parameters may refer to the descriptions of the aforementioned examples.

$$\left\lceil \frac{(O^0_{ACK} + O^0_{CRC})}{N^{RB}_{sc,\,ctrl} \cdot N^{PUCCH}_{symb-UCI} \cdot Q^0_m \cdot r^0} \right\rceil$$

may correspond to the number of PRBs for TX of the second HARQ-ACK, which is determined based on the number of bits of the second HARQ-ACK information and the corresponding maximum code rate (i.e., the maximum code rate of the second HARQ-ACK information) and the corresponding modulation order (i.e., the modulation order of the second HARQ-ACK information), and $$\left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil$$

may correspond to the number of PRBs for TX of the first HARQ-ACK, which is determined based on the number of bits of the first HARQ-ACK information and the corresponding maximum code rate (i.e., the maximum code rate of the first HARQ-ACK information) and the corresponding modulation order (i.e., the modulation order of the first HARQ-ACK information).

For PUCCH format 3, if $M^{PUCCH}_{RB,min}$ is not equal to $2^{\alpha_2} \cdot 3^{\alpha_3} \cdot 5^{\alpha_5}$, $M^{PUCCH}_{RB,min}$ should be increased to a closest value of $2^{\alpha_2} \cdot 3^{\alpha_3} \cdot 5^{\alpha_5}$. For example, valid values of $2^{\alpha_2} \cdot 3^{\alpha_3} \cdot 5^{\alpha_5}$ may be specified by protocols and/or configured by higher layer signaling (e.g., the 3GPP parameter nrofPRBs), where $\alpha_2$, $\alpha_3$, and $\alpha_5$ are non-negative integers. For example, if $M^{PUCCH}_{RB,min}$ is equal to 7, $M^{PUCCH}_{RB,min}$ should be increased to a closest value of $2^{\alpha_2} \cdot 3^{\alpha_3} \cdot 5^{\alpha_5}$, which is 8 at this time.

For PUCCH format 3, the second HARQ-ACK information may be mapped on $$\left\lceil \frac{(O^0_{ACK} + O^0_{CRC})}{N^{RB}_{sc,\,ctrl} \cdot N^{PUCCH}_{symb-UCI} \cdot Q^0_m \cdot r^0} \right\rceil PRBs.$$

The first HARQ-ACK information may be mapped on $$M^{PUCCH}_{RB,\,min} - \left\lceil \frac{(O^0_{ACK} + O^0_{CRC})}{N^{RB}_{sc,\,ctrl} \cdot N^{PUCCH}_{symb-UCI} \cdot Q^0_m \cdot r^0} \right\rceil PRBs.$$

Alternatively, the first HARQ-ACK information may be mapped on $$\left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil PRBs,$$

and then the second HARQ-ACK information may be mapped on $$M^{PUCCH}_{RB,\,min} - \left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil PRBs.$$

For example, when $$\left\lceil \frac{(O^0_{ACK} + O^0_{CRC})}{N^{RB}_{sc,\,ctrl} \cdot N^{PUCCH}_{symb-UCI} \cdot Q^0_m \cdot r^0} \right\rceil + \left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil \leq M^{PUCCH}_{RB},$$

the first HARQ-ACK information may be mapped on $$\left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil PRBs,$$

and then the second HARQ-ACK information may be mapped on $$\left\lceil \frac{(O^0_{ACK} + O^0_{CRC})}{N^{RB}_{sc,\,ctrl} \cdot N^{PUCCH}_{symb-UCI} \cdot Q^0_m \cdot r^0} \right\rceil PRBs.$$

As another example, when $$\left\lceil \frac{(O^0_{ACK} + O^0_{CRC})}{N^{RB}_{sc,\,ctrl} \cdot N^{PUCCH}_{symb-UCI} \cdot Q^0_m \cdot r^0} \right\rceil + \left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil > M^{PUCCH}_{RB},$$

the first HARQ-ACK information may be mapped on $$\left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil PRBs,$$

and then the second HARQ-ACK information may be mapped on $$M^{PUCCH}_{RB} - \left\lceil \frac{(O^1_{ACK} + O^1_{CRC})}{N^{RB}_{sc,\,ctrl} \cdot N^{PUCCH}_{symb-UCI} \cdot Q^1_m \cdot r^1} \right\rceil PRBs.$$

The number of REs for the UCI with the higher priority may be determined according to a PRB start position configured in a PUCCH format, the number of OFDM symbols, and the determined number of PRBs for TX of the UCI.

Approach d-2: determining a total number of PRBs for TX of the plurality of UCIs with different priorities (e.g., priority indexes) according to the plurality of UCI and corresponding maximum code rates, and performing the RE mapping.

Two UCI (i.e., the first UCI and the second UCI) and types of both the UCI being HARQ-ACK are taken as examples. In this case, the plurality of UCI include the first HARQ-ACK information (e.g., with the high priority (e.g., priority index 1) and the second HARQ-ACK information (e.g., with the lower priority ((e.g., priority index 0)).

When PUCCH format 2 or PUCCH format 3 is used, the UE may determine the number of PRBs, $M^{PUCCH}_{RB,min}$, for TX as:

$$\left\lceil \frac{(O^0_{ACK} + O^0_{CRC})}{N^{RB}_{sc,\,ctrl} \cdot N^{PUCCH}_{symb-UCI} \cdot Q_m \cdot r^0} \right\rceil + \left\lceil \frac{(O^1_{ACK} + O^1_{CRC})}{N^{RB}_{sc,\,ctrl} \cdot N^{PUCCH}_{symb-UCI} \cdot Q_m \cdot r^1} \right\rceil \quad (3)$$

In Equation (3), $O_{ACK}^0$ is the number of bits of the second HARQ-ACK, and $O_{CRC}^0$ is the number of bits of the CRC for the second HARQ-ACK; $O_{ACK}^1$ is the number of bits of the first HARQ-ACK, and $O_{CRC}^1$ is the number of bits of the CRC for the first HARQ-ACK; $N_{sc,ctrl}^{RB}$ is the number of subcarriers of a PRB that are available for TX of UCI information; $N_{symb-UCI}^{PUCCH}$ is the number of OFDM symbols available for TX of UCI information; $Q_m$ is a modulation order; $r^0$ is a maximum code rate of the second UCI (the second HARQ-ACK information); and $r^1$ is a maximum code rate of the first UCI (the first HARQ-ACK information).

For PUCCH format 3, if $M_{RB,min}^{PUCCH}$ is not equal to $2^{\alpha_2} \cdot 3^{\alpha_3} \cdot 5^{\alpha_5}$, $M_{RB,min}^{PUCCH}$ should be increased to a closest value of $2^{\alpha_2} \cdot 3^{\alpha_3} \cdot 5^{\alpha_5}$. For example, valid values of $2^{\alpha_2} \cdot 3^{\alpha_3} \cdot 5^{\alpha_5}$ may be specified by protocols and/or configured by higher layer signaling (e.g., the 3GPP parameter nrofPRBs), where $\alpha_2$, $\alpha_3$, and $\alpha_5$ are non-negative integers. The rate matching output sequence length $E^0$ of the second HARQ-ACK may be determined according to $Q_m$, $r^0$, $O_{CRC}^0$ and $O_{ACK}^0$, e.g., $$E^0 = \left\lceil \frac{(O_{ACK}^0 + O_{CRC}^0)}{Q_m \cdot r^0} \right\rceil \cdot Q_m,$$

and the rate matching output sequence length of the first HARQ-ACK $E^1$ may be $E_{tot} - E^0$, where $E_{tot}$ is the total rate matching output sequence length.

Alternatively, the rate matching output sequence length $E^1$ of the first HARQ-ACK may be determined according to $Q_m$, $r^1$, $O_{CRC}^1$ and $O_{ACK}^1$, e.g., $$E^1 = \left\lceil \frac{(O_{ACK}^1 + O_{CRC}^1)}{Q_m \cdot r^1} \right\rceil \cdot Q_m,$$

and the rate matching output sequence length $E^0$ of the second HARQ-ACK may be $E_{tot} - E^1$. If $M_{RB,min}^{PUCCH}$ is larger than a maximum available number of PRBs of a PUCCH format (e.g., the number of PRBs, $M_{RB}^{PUCCH}$ configured for PUCCH format 2 or PUCCH format 3), the maximum available number of the PRBs of the PUCCH format is used for TX.

When the RE mapping is performed, the UCI with the higher priority (e.g., priority index 1) may be mapped preferentially, and then the UCI with the lower priority (e.g., priority index 0) may be mapped.

The UCI with the higher may be mapped to REs with higher reliability. For example, the UCI with the higher priority may be mapped to symbols closer to a demodulation reference signal (DMRS), and then the UCI with the lower priority may be mapped.

For example, the number of REs to which the UCI with the lower is mapped may be determined according to $$\frac{(O_{ACK}^0 + O_{CRC}^0)}{Q_m \cdot r^0}.$$

If $$\frac{(O_{ACK}^0 + O_{CRC}^0)}{Q_m \cdot r^0}$$

is a non-integer, a rounding operation may be performed on it. The rounding operation may be a ceiling operation or a flooring operation. Then other available REs may be used to map the UCI with the higher priority.

The modulation orders of the first UCI and the second UCI are the same in this example. If the modulation orders of the first UCI and the second UCI are different, when PUCCH format 2 or PUCCH format 3 is used, the UE may determine that the number of PRBs for TX $M_{RB,min}^{PUCCH}$ may be replaced by Equation (4):

$$\left\lceil \frac{(O_{ACK}^0 + O_{CRC}^0)}{N_{sc,ctrl}^{RB} \cdot N_{symb-UCI}^{PUCCH} \cdot Q_m^0 \cdot r^0} \right\rceil + \left\lceil \frac{(O_{ACK}^1 + O_{CRC}^1)}{N_{sc,ctrl}^{RB} \cdot N_{symb-UCI}^{PUCCH} \cdot Q_m^1 \cdot r^1} \right\rceil \quad (4)$$

For PUCCH format 3, if $M_{RB,min}^{PUCCH}$ is not equal to $2^{\alpha_2} \cdot 3^{\alpha_3} \cdot 5^{\alpha_5}$, $M_{RB,min}^{PUCCH}$ should be increased to a closest value of $2^{\alpha_2} \cdot 3^{\alpha_3} \cdot 5^{\alpha_5}$. For example, valid values of $2^{\alpha_2} \cdot 3^{\alpha_3} \cdot 5^{\alpha_5}$ may be specified by protocols and/or configured by higher layer signaling (e.g., the 3GPP parameter nrofPRBs), where $\alpha_2$, $\alpha_3$, and $\alpha_5$ are non-negative integers. The rate matching output sequence length $E^0$ of the second HARQ-ACK may be determined according to $Q_m^0$, $r^0$, $O_{CRC}^0$ and $O_{ACK}^0$, e.g., $$E^0 = \left\lceil \frac{(O_{ACK}^0 + O_{CRC}^0)}{Q_m^0 \cdot r^0} \right\rceil \cdot Q_m^0,$$

and the rate matching output sequence length $E^1$ of the first HARQ-ACK may be $E_{tot} - E^0$, where $E_{tot}$ is the total rate matching output sequence length.

Alternatively, the rate matching output sequence length $E^1$ of the first HARQ-ACK may be determined according to $Q_m^1$, $r^1$, $O_{CRC}^1$ and $O_{ACK}^1$, e.g., $$E^1 = \left\lceil \frac{(O_{ACK}^1 + O_{CRC}^1)}{Q_m^1 \cdot r^1} \right\rceil \cdot Q_m^1,$$

and the rate matching output sequence length of the second HARQ-ACK $E^0$ may be $E_{tot} - E^1$. If $M_{RB,min}^{PUCCH}$ is larger than a maximum available number of PRBs of a PUCCH format (e.g., the number of PRBs, $M_{RB}^{PUCCH}$, configured for PUCCH format 2 or PUCCH format 3), the maximum available number of the PRBs of the PUCCH format is used for TX.

For Approach d-1 and Approach d-2, when the number of PRBs available for TX of the UCI with the lower priority is less than a threshold value, the UCI is not transmitted, or when a code rate for TX of the UCI with the lower priority exceeds a threshold value, the UCI is not transmitted. For example, the threshold values may be configured by higher layer signaling or specified by technical specifications. As another example, the threshold values may be determined by a maximum payload size parameter (e.g., the 3GPP parameter maxPayloadSize). The threshold values may be a maximum payload size parameter in a PUCCH resource set parameter (e.g., the 3GPP parameter PUCCH-ResourceSet) with the largest index (e.g., the last one in the 3GPP parameter resourceSetToAddModList) in a PUCCH configuration parameter with the higher priority (e.g., the 3GPP parameter PUCCH-Config). The threshold values may be a maximum payload size parameter in a PUCCH resource set parameter (e.g., the 3GPP parameter PUCCH-ResourceSet) with the largest index in a PUCCH configuration parameter with the higher priority (e.g., the 3GPP parameter PUCCH-Config). The threshold values may be a maximum payload size parameter in the last SPS PUCCH ACK/NACK parameter (e.g., the 3GPP parameter SPS-PUCCH-AN) in a SPS PUCCH ACK/NACK list parameter with the higher priority (e.g., the 3GPP parameter SPS-PUCCH-AN-List).

The threshold values may be configured separately for HARQ-ACK for dynamically scheduled PDSCHs and HARQ-ACK for SPS PDSCHs only, or the threshold values may be configured uniformly for HARQ-ACK for dynamically scheduled PDSCHs and HARQ-ACK for SPS PDSCHs only.

Alternatively, the threshold values are only valid for HARQ-ACK for SPS PDSCHs only (which may be SPS PDSCHs with the higher priority and/or SPS PDSCHs with the lower priority), and for HARQ-ACK for dynamically scheduled PDSCHs, the base station may dynamically indicate to multiplex/drop the HARQ-ACK thereof through DCI.

If the SPS PUCCH ACK/NACK list parameter (e.g., the 3GPP parameter SPS-PUCCH-AN-List) is not configured in the PUCCH configuration parameter with the higher priority, they may be specified by protocols and/or configured by higher layer signaling. If a PUCCH carrying HARQ-ACK with the lower priority overlaps with a PUCCH carrying HARQ-ACK with the higher priority that corresponds to SPS PDSCHs only in time domain, the UE transmits the PUCCH carrying the HARQ-ACK with the higher priority that corresponds to SPS PDSCHs only, and UE does not transmit the PUCCH carrying HARQ-ACK with the lower priority. If the total number of bits of the HARQ-ACKs is larger than a predetermined number of bits (e.g., 2 bits), the UE transmits the PUCCH carrying the HARQ-ACK with the higher priority that corresponds to SPS PDSCHs only, and the UE does not transmit the PUCCH carrying the HARQ-ACK with the lower priority. If the total number of bits of the HARQ-ACKs is equal to the predetermined number of bits (e.g., 2 bits), the UE multiplexes the HARQ-ACK with the higher priority that corresponds to SPS PDSCHs only and the HARQ-ACK with the lower priority in a PUCCH. For example, the PUCCH may be the PUCCH carrying the HARQ-ACK with the higher priority that corresponds to SPS PDSCHs only. The method clarifies behaviors of the UE, and can improve reliability of UCI TX.

In accordance with the above-described embodiments of the disclosure, various methods are provided for determining the number of PRBs and the mode for RE mapping. In Approach d-1, the number of PRBs is determined and the RE mapping is performed respectively for UCI with different priorities, and an error of the number of bits of the UCI with the low priority will not affect the determination of the number of the PRBs and the RE mapping of the UCI with the high priority. Consequently, reliability of UCI TX may be improved.

In Approach d-2, for the UCI with different priorities, the number of PRBs is jointly determined and the RE mapping is performed, which may reduce PUCCH resources for TX of UCI while ensuring TX reliability. In addition, TX reliability of the UCI with the high priority may be improved, by mapping the UCI with the high priority on REs with higher reliability when performing mapping.

When the plurality of UCI with different priorities (e.g., physical layer priorities) are multiplexed in a PUCCH format (e.g., PUCCH format 2, PUCCH format 3 or PUCCH format 4) and separately encoded, if the number of bits of one or more UCI of the plurality of UCI is less than a threshold number (e.g., the threshold number may be 3 or a value less than or equal to 2), the number of the bits of the one or more UCI may be separately expanded to N bits by predefined rules. N may be an integer larger than or equal to a threshold number (e.g., 3). UCI information bits may be expanded to 3 bits by adding known bits. For example, the UCI information bits may be expanded to 3 bits by adding zero bits at the end. More specifically, '1' may be expanded to '100'; '0' may be expanded to '000'; '10' may be expanded to '100'; '00' may be expanded to '000'; '01' may be expanded to '010'; and '11' may be expanded to '110'.

The number of the bits of the UCI may also be expanded by repetition coding (e.g., repeating UCI bits). For example, UCI of 1 bit may be extended to 0.3 bits by repetition coding. Additionally or alternatively, UCI of 2 bits may be extended to 4 bits by repetition coding. More specifically, '1' may be expanded to '111'; '0' may be expanded to '000'; and '01' may be expanded to '0101'.

If a priority includes (e.g., corresponds to) a plurality of types of UCI, such as HARQ-ACK and SR, the plurality of types of UCI included in the priority may be jointly encoded. When the plurality of types of UCI included in the priority are jointly encoded, if the total number of bits of the plurality of types of UCI included in the priority is less than or equal to a predetermined or preset threshold number, the total number of bits of the plurality of types of UCI included in the priority may be extended to N bits, where N may be an integer greater than or equal to the threshold number. For example, when the HARQ-ACK and SR corresponding to a priority (e.g., one of the higher priority or the lower priority) are determined to be jointly encoded, and the total number of bits of the HARQ-ACK and SR is less than or equal to a predetermined threshold number, the total number of bits of the HARQ-ACK and SR may be expanded to N bits, by adopting various example methods described above.

In accordance with an embodiment of the disclosure, a method is provided for expanding the bits of UCI depending on the number of bits of the UCI when a plurality of UCI with different priorities are multiplexed in a PUCCH format and separately encoded. The method may improve reliability of UCI TX, reduce retransmission probability of downlink data and improve spectrum efficiency of the system. For example, if 1-bit '0/1' is expanded to 3-bit '000/111' and RM coding (e.g., coding as defined in 3GPP TS38.212) is adopted, two encoded codewords are all zeros of 32 bits and all ones of 32 bits, respectively. In this way, a code distance between the two encoded codewords is the largest, so performance is the best, and TX reliability may be improved.

When the plurality of UCI with different priorities (e.g., physical layer priorities) are multiplexed in a PUCCH and jointly encoded, a specific (additional) maximum code rate parameter may be configured for the jointly encoded UCI (e.g., HARQ-ACK information with the higher priority and HARQ-ACK information with the lower priority, or HARQ-ACK information with the higher priority and HARQ-ACK information with the lower priority and SR information with the higher priority). For example, it may be configured in the second PUCCH configuration (a PUCCH configuration with the higher priority, e.g., a second PUCCH-Config parameter in the 3GPP parameter PUCCH-ConfigurationList.

For the convenience of description, the "specific (additional) maximum code rate" describe above may also be referred to as a second additional maximum code rate, in order to distinguish it from a maximum code rate (e.g., the parameter maxCodeRate) configured in an existing PUCCH format and the aforementioned additional maximum code rate. In the embodiments of the present disclosure, the "second additional maximum code rate" or "second additional maximum code rate parameter" may be used for joint coding of the UCI with different priorities.

The second additional maximum code rate parameter may be configured for each PUCCH format separately, e.g., it may be configured in the 3GPP parameter PUCCH-Format-Config. The UE determines the number of PRBs carrying jointly encoded UCI according to the second additional maximum code rate parameter. The number of the PRBs for the PUCCH TX may be determined according to the method in the technical specification 3GPP TS38.213, and then the RE mapping may be performed according to the method in the technical specification 3GPP TS38.212.

The second additional maximum code rate parameter may also be individually configured for different number of bits (or different coding types). If the number of the bits of the jointly encoded UCI is less than or equal to the parameter M1, a second additional maximum code rate parameter of a PUCCH format may be configured as P1. If the number of the bits of the jointly encoded UCI is larger than the parameter M1, a second additional maximum code rate parameter of a PUCCH format may be configured as P2. M1 may be a positive integer, e.g., M1 is equal to 11.

If the jointly encoded UCI is encoded by adopting an RM code, a second additional maximum code rate parameter of a PUCCH format may be configured as P3. If the jointly encoded UCI is encoded by adopting Polar code, a second additional maximum code rate parameter of a PUCCH format may be configured as P4, or the second additional maximum code rate parameter may also be collectively configured for different number of bits (or different coding).

As another example, if the number of the bits of the jointly encoded UCI is less than or equal to the parameter M2, a second additional maximum code rate parameter of a PUCCH format may be configured as P5. If the number of the bits of the jointly encoded UCI is larger than the parameter M2 and less than or equal to the parameter M3. A second additional maximum code rate parameter of a PUCCH format may be configured as P6, if the number of the bits of the jointly encoded UCI is larger than the parameter M3.

M2 and M3 may be positive integers. For example, M2 may be equal to 2, and M3 may be equal to 11.

When a plurality of UCI with different priorities (e.g., physical layer priorities) are multiplexed in a PUCCH, the joint coding of two or more UCI may be specified by protocols or configured by higher layer parameters. For example, each of the plurality of UCI may include HARQ-ACK information, SRs or CSI. For example, the CSI may be CSI with the higher priority and/or CSI with the lower priority; or the CSI may also be Part 1 CSI or Part 2 CSI. HARQ-ACK information with the lower priority and/or SRs with the lower priority may be jointly encoded with Part 2 CSI. HARQ-ACK information with the higher priority and/or SRs with the higher priority may be jointly encoded with Part 1 CSI. The method may avoid dropping UCI with the lower priority when the number of encoders is limited, thereby improving the probability and reliability of UCI TX.

When a plurality of UCI with different priorities are multiplexed in a PUSCH, joint coding of two or more UCI may be specified by protocols or configured by higher layer parameters. For example, the HARQ-ACK information with the lower priority and the HARQ-ACK information with the higher priority may be configured to be jointly encoded. As another example, the HARQ-ACK information with the lower priority may be jointly encoded with CSI. The CSI may include CSI with the higher priority and/or CSI with the lower priority, or the CSI may also include Part 1 CSI (first part CSI) or Part 2 CSI (second part CSI).

A specific (additional) parameter betaOffsets and/or parameter $\alpha$ (alpha) (or scaling parameter) are configured for the jointly encoded UCI (e.g., the HARQ-ACK information with the higher priority and the HARQ-ACK information with the lower priority, or the HARQ-ACK information with the lower priority and CSI) by higher layer signaling, for determining the number of REs of the jointly encoded UCI. The specific (additional) parameter betaOffsets and/or parameter alpha (or scaling parameter) may be configured in the 3GPP parameter PUSCH-Config. For example, the specific (additional) parameter betaOffsets and/or parameter alpha (or scaling parameter) may be configured for the jointly encoded UCI.

The specific (additional) parameter beta Offsets and/or parameter alpha (or scaling) may be configured individually or collectively for PUSCHs with different priorities. The specific (additional) parameter betaOffsets and/or parameter alpha (scaling) may be configured individually or collectively for a dynamically scheduled PUSCH and a semi-statically configured PUSCH. For a certain priority, the specific (additional) parameter betaOffsets and/or parameter alpha (scaling) may be configured individually or collectively for a dynamically scheduled PUSCH and a semi-statically configured PUSCH. The UE determines the number of the REs carrying the jointly encoded UCI according to the specific (additional) parameter betaOffsets and/or parameter alpha (scaling). For example, the number of the REs carrying the jointly encoded UCI may be determined according to the method in the technical specification 3GPP TS38.213, and then the RE mapping may be performed according to the method in the technical specification 3GPP TS38.212.

A method for multiplexing UCI to the PUSCH is illustrated specifically by taking the joint coding of the HARQ-ACK information with the higher priority and the HARQ-ACK information with the lower priority as an example. However, this is only an example, and this method may be applied to the joint coding of other types of UCI with different priorities (e.g., after slight modification). When the HARQ-ACK information with the higher priority and the HARQ-ACK information with the lower priority are jointly encoded, the number of HARQ-ACK symbols per layer $O_{ACK}$ may be obtained from the following Equations (5)-(7):

$$O_{ACK} = \min\{A, B\} \quad (5)$$

$$A = \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil \quad (6)$$

$$B = \left\lceil \alpha \cdot \sum_{l=l_0}^{N_{symb,all}^{PUSCH}-1} M_{sc}^{UCI}(l) \right\rceil \quad (7)$$

In Equations (5)-(7):

$O_{ACK}$ is a sum of the number of the HARQ-ACK information bits with the higher priority and the number of the HARQ-ACK information bits with the lower priority.

$L_{ACK}$ is the number of CRC bits; $L_{ACK}$ may be determined according to $O_{ACK}$. For example, $L_{ACK}$ may be determined according to the method defined in 3GPP TS 38.212.

$\beta_{offset}^{PUSCH} = \beta_{offset}^{HARQ-ACK}$ is a specific (additional) parameter betaOffsets when the HARQ-ACK information with the higher priority and the HARQ-ACK information with the lower priority are jointly encoded, as described above.

$C_{UL-SCH}$ is the number of code blocks of the PUSCH.

$K_r$ is a size of the r-th code block, and it is 0 if this block is not transmitted (for example, a corresponding CBG is indicated to be 0 by code block group TX information (CBGTI)).

$M_{sc}^{PUSCH}$ is the bandwidth of the PUSCH TX, with a unit of a number of subcarriers.

$M_{sc}^{PT-RS}(l)$ is the number of subcarriers in OFDM symbol l that carries a phase tracking reference signal (PTRS) in the PUSCH.

$M_{sc}^{UCI}(l)$ is the number of REs that can be used for TX of UCI in OFDM symbol l, for l=0, 1, 2, . . . , $N_{symb,all}^{PUSCH}-1$, in the PUSCH, and $N_{symb,all}^{PUSCH}$ is the total number of OFDM symbols of the PUSCH, including OFDM symbols of DMRS.

$M_{sc}^{UCI}(l)=0$, for any OFDM symbol that carries DMRS.

$M_{sc}^{UCI}(l)=M_{sc}^{PUSCH}-M_{sc}^{PT-RS}(l)$, for any OFDM symbol that does not carry DMRS.

α is a scale parameter configured by higher layer signaling; for example, α may be a specific (additional) parameter alpha (scaling) when the HARQ-ACK information with the higher priority and the HARQ-ACK information with the lower priority are jointly encoded, as described above.

$l_0$ is the first OFDM symbol that does not carry DMRS of the PUSCH, after the first DMRS symbol in the PUSCH.

It should be noted that $N_{symb,all}^{PUSCH}$ may be either the number of symbols in a nominal repetition of the TX or the number of symbols in the actual repetition of the TX.

Whether the HARQ-ACK information with the lower priority is jointly encoded with the HARQ-ACK information with the higher priority or CSI may be determined according to reported capability by the UE and/or a higher layer signaling configuration. For example, the UE may report the maximum number of separate encoding supported in a PUSCH. As another example, the UE may report whether it supports joint coding of the HARQ-ACK information with the lower priority and the HARQ-ACK information with the higher priority or CSI.

A mapping priority and mapping order of UCI should be defined when RE mapping of the UCIs is performed in the PUSCH. For example, when the HARQ-ACK information with the lower priority and Part 1 CSI are jointly encoded, the mapping priority and mapping order may be the HARQ-ACKs with the higher priority, both the HARQ-ACK information with the lower priority and Part 1 CSI, and Part 2 CSI in turn. When the HARQ-ACK information with the lower priority and Part 2 CSI are jointly encoded, the mapping priority and mapping order may be the HARQ-ACK information with the higher priority, Part 1 CSI, and both the HARQ-ACK information with the lower priority and Part 2 CSI in turn. If the number of the REs is limited, the UCI with the higher priority may be mapped (or transmitted) preferentially according to the mapping priority, and the UCI with the lower priority is not mapped (or transmitted).

If the specific (additional) parameter betaOffsets and/or parameter alpha (scaling) are not configured, when REs of the HARQ-ACK information with the lower priority and Part 1 CSI (or Part 2 CSI) are determined, they may be determined according to the parameter betaOffsets and/or the parameter alpha (scaling) of Part 1 CSI (or Part 2 CSI).

Some instances of joint coding when the UCI with different priorities are multiplexed are described above. By the methods in these instances, when the plurality of UCI are to be encoded, each of which is of a different priority, the number of encoders may decrease, the complexity and cost of terminal implementation may be reduced, the complexity and time of network decoding may be reduced, network performance may be improved, the dropping of UCI due to a limited number of encoders may be avoided, and the reliability and TX probability of UCI may be improved.

In addition, PRBs/REs may be determined by the additionally configured maximum code rate parameter, parameter betaOffsets and/or parameter alpha (scaling), and thus spectrum efficiency of the system may also be improved.

Further, when the joint coding is adopted, for some coding manners, e.g., Polar coding, since a code length becomes longer, the coding performance may be improved and the block error ratio (BLER) may be reduced. By additionally configuring the maximum code rate (e.g., a lower maximum code rate), physical resources occupied by UCI may be reduced on the premise of ensuring reliability of the UCI, thereby improving the spectrum efficiency of the system.

When the plurality of UCI with different priorities are multiplexed and transmitted in the same PUCCH, how to determine PUCCH resources for TX is still a problem to be solved. In accordance with an embodiment of the disclosure, at least one of the following approaches may be adopted to solve this problem.

Approach e-1: the priority of a PUCCH resource is dynamically indicated in a DCI format, and the PUCCH resource for TX is determined based on the indicated priority.

It is possible to determine which PUCCH configuration the PUCCH resource belong to according to the priority of the PUCCH resource indicated by the last DCI format, and then determine the PUCCH resource to be used (e.g., according to the method in 3GPP TS 38.213). A set of PUCCHs may be determined according to a size of UCI, and then a PUCCH resource in the determined set of PUCCHs may be selected according to a PUCCH resource indication in DCI.

Approach e-2: the priority of a PUCCH resource is determined according to predefined rules, and a PUCCH resource for TX is determined based on the determined priority. Some examples of predefined rules are described below.

As described above, the number of the PRBs, NPRB, may be determined according to the number of the bits of the UCI with different priorities, the maximum code rate, the number of the subcarriers of a PRB that are available for TX of UCI, the number of the OFDM symbols available for TX of UCI, and the modulation order. A PUCCH resource with the higher priority (e.g., priority index 1) is used when the determined number of the PRBs, NPRB, is not larger than the number of PRBs configured in a PUCCH format with the higher. A PUCCH resource with the lower priority (e.g., priority index 0) is used when NPRB is larger than the number of the PRBs configured in the PUCCH format with the higher priority and not larger than the number of PRBs configured in a PUCCH format with the lower priority.

When NPRB is larger than the number of the PRBs configured in the PUCCH format with the higher priority and larger than the number of the PRBs configured in the PUCCH format with the lower priority, only UCI with the larger priority index is transmitted and the PUCCH resource with the higher priority is used.

Various methods for determining a PUCCH resource for TX according to an embodiment of the disclosure are described above. Approach e-1 may dynamically indicate the used PUCCH resource through base station scheduling, so the implementation complexity is low. Approach e-2 clarifies conditions of using the PUCCH resources with different priorities, and thus improves the reliability of UCI TX.

Methods for the plurality of UCI with different priorities in the embodiments of the disclosure are also applicable to scenarios where priority indexes of the plurality of UCI are the same, but types of the plurality of UCI are different from each other, and are also applicable to scenarios where the priority indexes of the plurality of UCI are different from each other and UCI types of the plurality of UCI are different from each other.

Methods for multiplexing the plurality of UCI with different priorities in the above-described embodiments of the disclosure may also be applicable to multiplexing of unicast UCI and groupcast (or multicast)/broadcast UCI. In this case, various methods for multiplexing of unicast UCI and groupcast/broadcast UCI may be obtained by replacing the "a plurality of UCI with different priorities" in the above-described embodiments with "unicast UCI and groupcast/broadcast UCI" or by replacing the "a plurality of UCI with different priorities" in the above-described embodiments with "unicast UCI and groupcast/broadcast UCI(s) with the same priority". For the sake of brevity, detailed descriptions of the alternatives are omitted here.

In accordance with an embodiment of the disclosure, unicast may refer to a way in which a network communicates with one UE, and groupcast/broadcast may refer to a way in which the network communicates with a plurality of UEs. For example, a unicast PDSCH may be a PDSCH received by one UE, and the scrambling of the PDSCH may be based on a UE-specific radio network temporary indicator (RNTI), e.g., C-RNTI. A groupcast/broadcast PDSCH may be a PDSCH received by more than one UE at the same time, and the scrambling of the PDSCH may be based on a UE-group-common RNTI, e.g., groupcast/broadcast services (MBS)-RNTI. Unicast UCI may include HARQ-ACK information, an SR, or CSI of the unicast PDSCH. Groupcast (or multicast)/broadcast UCI may include HARQ-ACK information of the groupcast/broadcast PDSCH.

When the unicast UCI and groupcast (or multicast)/broadcast UCI are multiplexed in a PUCCH and jointly encoded, a specific (additional) maximum code rate parameter may be configured for the jointly encoded UCI (e.g., the HARQ-ACK information of the groupcast/broadcast PDSCH and Part 2 CSI, or HARQ-ACK(s) of the groupcast/broadcast PDSCH and at least one of HARQ-ACKs, an SR and CSI of the unicast PDSCH), and for example, it may be configured in a PUCCH configuration (e.g., the 3GPP parameter PUCCH-Config).

For the convenience of description, the "specific (additional) maximum code rate" may be referred to as a third additional maximum code rate in the embodiments of the present disclosure, in order to distinguish it from a maximum code rate (e.g., the parameter maxCodeRate) configured in an existing PUCCH format and the aforementioned additional maximum code rate and second additional maximum code rate. The "third additional maximum code rate" or "third additional maximum code rate parameter" may be used for joint coding of the unicast UCI and groupcast/broadcast UCI. However, the embodiments of the disclosure are not limited to this, and the same parameter may be used to indicate one or more of the additional maximum code rate, the second additional maximum code rate, and the third additional maximum code rate, or different parameters may be used to indicate the additional maximum code rate, the second additional maximum code rate and the third additional maximum code rate.

The third additional maximum code rate parameter may be individually configured for each PUCCH format, e.g., configured in the 3GPP parameter PUCCH-FormatConfig. The UE determines the number of the PRBs carrying the jointly encoded UCI according to the third additional maximum code rate parameter. The number of the PRBs for the PUCCH TX may be determined according to the method in the technical specification 3GPP TS38.213, and then the RE mapping may be performed according to the method in the technical specification 3GPP TS38.212. The method for multiplexing the UCIs into the PUSCH may refer to the previous description, and details will be omitted here.

The third additional maximum code rate parameter may also be individually configured for different numbers of bits (or different coding). For example, it may be configured according to the configuration methods in various embodiments of the present disclosure.

When the unicast UCI and the groupcast (or multicast)/broadcast UCI are multiplexed in a PUSCH, joint coding of two or more UCI (e.g., HARQ-ACKs of the groupcast/broadcast PDSCH and HARQ-ACKs of the unicast PDSCH, or HARQ-ACKs and CSI of the groupcast/broadcast PDSCH) may be specified by protocols or configured by higher layer parameters. The CSI may include CSI with the higher priority and/or CSI with the lower priority, or the CSI may also include Part 1 CSI (first part CSI) or Part 2 CSI (second part CSI).

The specific (additional) parameter betaOffsets and/or parameter alpha (scaling) may be configured for the jointly encoded UCI by higher layer signaling for determining the number of REs of the jointly encoded UCI. The specific (additional) parameter betaOffsets and/or parameter alpha (scaling) may be configured in the 3GPP parameter PUSCH-Config. For example, the specific (additional) parameter betaOffsets and/or parameter alpha (scaling) may be configured individually or collectively for PUSCHs with different priorities. As another example, the specific (additional) parameter betaOffsets and/or parameter alpha (scaling) may be configured individually or collectively for a dynamically scheduled PUSCH and a semi-statically configured PUSCH. As another example, for a certain priority, the specific (additional) parameter betaOffsets and/or parameter alpha (scaling) may be configured individually or collectively for a dynamically scheduled PUSCH and a semi-statically configured PUSCH. The UE may determine the number of the REs carrying the jointly encoded UCI according to the specific (additional) parameter betaOffsets and/or parameter alpha (scaling). The number of the REs carrying the jointly encoded UCI may be determined according to the method in the technical specification 3GPP TS38.213, and then the RE mapping may be performed according to the method in the technical specification 3GPP TS38.212.

Whether one or more unicast UCI are jointly encoded with the groupcast/broadcast UCI may be determined according to a reported capability by the UE and/or a higher layer signaling configuration. For example, the UE may report the maximum number of separate encoding supported in a PUSCH. As another example, the UE may report whether it supports joint coding of the one or more unicast UCI with the groupcast (or multicast)/broadcast UCI. A mapping priority and mapping order of UCI should be defined when RE mapping of the UCIs is performed at the PUSCH. For example, the mapping priority and mapping order may be the HARQ-ACKs of the unicast PDSCH, both the HARQ-ACKs of the groupcast/broadcast PDSCH and Part 1 CSI, and Part 2 CSI in turn. The mapping priority and mapping order may be the HARQ-ACKs of the unicast PDSCH, Part 1 CSI, and both the HARQ-ACKs of the groupcast/broadcast PDSCH and Part 2 CSI in turn. If the number of the REs is limited, the UCI with the higher priority is mapped (or transmitted) preferentially according to the mapping priority, and the UCI with the lower priority is not mapped (or transmitted).

If the specific (additional) betaOffsets and/or parameter alpha (scaling) are not configured, when REs of the HARQ-ACK(s) of the groupcast/broadcast PDSCH and Part 1 CSI (or Part 2 CSI) are determined, they may be determined according to the betaOffsets and/or parameter alpha (scaling) of Part 1 CSI (or Part 2 CSI).

When the unicast UCI and groupcast (or multicast)/broadcast UCI are multiplexed in a PUSCH, if the unicast UCI and groupcast (or multicast)/broadcast UCI are separately encoded, the mapping priority and mapping order of UCI should be defined when RE mapping of the UCI is performed at the PUSCH. For example, the mapping priority and mapping order may be the HARQ-ACKs of the unicast PDSCH, the HARQ-ACKs of the groupcast/broadcast PDSCH, Part 1 CSI and Part 2 CSI in turn, or the mapping priority and mapping order may be the HARQ-ACKs of the unicast PDSCH, Part 1 CSI, the HARQ-ACKs of the groupcast/broadcast PDSCH, and Part 2 CSI in turn.

Alternatively, the mapping priority and mapping order may be the HARQ-ACKs of the unicast PDSCH, Part 1 CSI, Part 2 CSI, and the HARQ-ACKs of the groupcast/broadcast PDSCH in turn. If the number of the REs is limited, the UCI with the higher priority may be mapped (or transmitted) preferentially according to the mapping priority, and the UCI with the lower priority is not mapped (or transmitted).

The specific (additional) parameter betaOffsets and/or parameter alpha (scaling) may be configured for the HARQ-ACK for the groupcast/broadcast PDSCH according to the methods of other embodiments of the disclosure.

Instances of joint coding are described above for when a plurality of UCI associated with different PDSCH cast types are multiplexed. By the methods in these instances, when a plurality of UCI should be coded, each of which corresponding to a different PDSCH cast type (e.g., unicast type, groupcast (or multicast) type), the number of encoders may decrease, the complexity and cost of terminal implementation may be reduced, the complexity and time of network decoding may be reduced, network performance may be improved, the dropping of UCI due to a limited number of encoders may be avoided, and the reliability and TX probability of UCI may be improved. In addition, PRBs/REs may be determined by the additionally configured maximum code rate parameter, parameter betaOffsets and/or parameter alpha (scaling), and thus the spectrum efficiency of the system may be improved.

UCI with different priorities may be multiplexed in a PUCCH (e.g., PUCCH with the higher priority), where the UCI with different priorities are separately encoded. The PUCCH resource set and/or PUCCH resource may be determined according to the total number of UCI bits with different priorities and/or a predefined parameter.

For example, HARQ-ACKs with different priorities (e.g., in which HARQ-ACKs with the higher priority are dynamically scheduled HARQ-ACKs) and/or SRs (e.g., SRs with the higher priority) are multiplexed in a PUCCH. In an accordance with an embodiment, which PUCCH resource set to use may be determined based on at least one of: the sum of the numbers of HARQ-ACK bits with different priorities (including at least the HARQ-ACK with the higher priority and HARQ-ACK with the lower priority); whether the HARQ-ACKs with different priorities are jointly encoded; the number of the HARQ-ACK bits with the higher priority and/or the SRs; the number of the HARQ-ACK bits with the lower priority; the predefined parameter, which may adjust the number of the HARQ-ACK bits with the lower priority, and may be related to a code rate (e.g., a maximum code rate) of the HARQ-ACK with the higher priority and/or a code rate (e.g., a maximum code rate) of the HARQ-ACK with the lower priority. Particularly, the PUCCH resource set may be determined by adopting following Approach 1 and/or Approach 2 below.

Approach 1: if the number of the HARQ-ACK bits with different priorities is equal to a predetermined value (e.g., 2) and/or if the HARQ-ACKs with different priorities are jointly encoded (or the HARQ-ACKs with different priorities are not separately encoded), the determined PUCCH resource set is a first PUCCH resource set (e.g., the 3GPP parameter pucch-ResourceSetId=0). If the numbers of the HARQ-ACK bits with different priorities is larger than the predetermined value (e.g., 2) and/or if the HARQ-ACKs with different priorities are separately encoded (or the HARQ-ACKs with different priorities are not jointly encoded), then the PUCCH resource set is determined according to the number of the HARQ-ACK bits with the higher priority and/or the SRs (e.g., denoted by a parameter $O_{HP}$), the number of the HARQ-ACK bits with the lower priority (e.g., denoted by a parameter $O_{LP}$) and the predefined parameter.

The PUCCH resource set may be determined based on the sum (e.g., denoted by a parameter $O_{UCI}'$) of the number of the HARQ-ACK bits with the higher priority and/or the SRs (e.g., denoted by the parameter $O_{HP}$) and a value obtained by multiplying the number of the HARQ-ACK bits with the lower priority (e.g., denoted by the parameter $O_{LP}$) by the predefined parameter (e.g., denoted by a parameter $\alpha$). For example, $O_{UCI}'$ may be expressed as $O_{UCI}'=O_{HP}+O_{LP}\times\alpha$. If $O_{UCI}'$ is less than or equal to $N_2$, the determined PUCCH resource set is a second PUCCH resource set (e.g., the 3GPP parameter pucch-ResourceSetId=1); if $O_{UCI}'$ is greater than $N_2$ and less than or equal to $N_3$, the determined PUCCH resource set is a third PUCCH resource set (e.g., the 3GPP parameter pucch-ResourceSetId=2); and if $O_{UCI}'$ is greater than $N_3$ and less than or equal to $N_3$, the determined PUCCH resource set is a fourth PUCCH resource set (e.g., the 3GPP parameter pucch-ResourceSetId=3).

Approach 2: the PUCCH resource set is determined according to the number of the HARQ-ACK bits with the higher priority and/or the SRs (e.g., denoted by a parameter $O_{HP}$), the number of the HARQ-ACK bits with the lower priority (e.g., denoted by a parameter $O_{LP}$) and the predefined parameter (e.g., denoted by a parameter $\alpha$). The PUCCH resource set may be determined based on a sum (e.g., denoted by a parameter $O_{UCI}'$) of the number of the HARQ-ACK bits with the higher priority and/or the SRs and a value obtained by multiplying the number of the HARQ-ACK bits with the lower priority by the predefined parameter. For example, $O_{UCI}'$ may be expressed as $O_{UCI}'=O_{HP}+O_{LP}\times\alpha$. If $O_{UCI}'$ is less than or equal to a predetermined value (e.g., 2), the determined PUCCH resource set is a first PUCCH resource set (e.g., the 3GPP parameter pucch-ResourceSetId=0); if $O_{UCI}'$ is larger than the predetermined value (e.g., 2) and less than or equal to $N_2$, the determined PUCCH resource set is a second PUCCH resource set (e.g., the 3GPP parameter pucch-ResourceSetId=1); if $O_{UCI}'$ is greater than $N_2$ and less than or equal to $N_3$, the determined PUCCH resource set is a third PUCCH resource set (e.g., the 3GPP parameter pucch-ResourceSetId=2); and if $O_{UCI}'$ is greater than $N_3$ and less than or equal to 1076, the determined PUCCH resource set is a fourth PUCCH resource set (e.g., the 3GPP parameter pucch-ResourceSetId=3).

The re-determined PUCCH resource set is the second PUCCH resource set (e.g., the 3GPP parameter pucch-ResourceSetId=1), if the determined PUCCH resource set is the first PUCCH resource set, and the sum of the numbers of the HARQ-ACK bits with the higher priority and the HARQ-ACK bits with the lower priority is greater than the predetermined value (e.g., 2) or the HARQ-ACKs with different priorities are separately encoded.

Approach 1 and Approach 2 may also be applicable to determine PUCCH resource carrying SPS PDSCHs HARQ-ACK, e.g., by replacing the "PUCCH resource set" with the "PUCCH resource", the parameter pucch-ResourceSetId with the 3GPP parameter sps-PUCCH-AN-ResourceID, the parameter $N_2$ with $N_{1,SPS}$, the parameter $N_3$ with $N_{2,SPS}$, and "1076" with $N_{3,SPS}$ in the above-described embodiments.

The predefined parameter α may be configured by higher layer signaling or may be an offset defined in other embodiments of the present disclosure. The predefined parameter α may be a ratio between the code rate (e.g., maximum code rate) of the HARQ-ACK(s) with the lower priority and the code rate (e.g., maximum code rate) of the HARQ-ACK(s) with the higher priority and/or the SRs.

The "parameter $O_{UCI}'$" may also be replaced by the "rounded value of the parameter $O_{UCI}'$", and the rounding operation may be rounding up, rounding down or rounding.

If it is determined that PUCCH resources carrying the UCIs with different priorities are PUCCH format 2, it may be specified by protocols and/or configured by higher layer signaling that the UCI with the lower priority (e.g., HARQ-ACK) are not transmitted. Alternatively, the selected PUCCH may be used to transmit the UCI with the higher priority, or the PUCCH resources may be re-determined according to the number of the UCI bits with the higher priority.

Parameters $N_2$, $N_3$, $N_{1,SPS}$, $N_{2,SPS}$, or $N_{3,SPS}$ may be configured by higher layer signaling. If one or more of the parameters $N_2$, $N_3$, $N_{1,SPS}$, $N_{2,SPS}$, or $N_{3,SPS}$ are not configured by the higher layer signaling, then values of the one or more of the parameters $N_2$, $N_3$, $k_{1,SPS}$, $N_{2,SPS}$, or $N_{3,SPS}$ may be equal to a predefined value. For example, the predefined value may be 1076.

The methods according to the above embodiments of the disclosure may determine the PUCCH resource set/PUCCH resources according to the number of UCI bits and a predefined parameter related to the code rate. Since the code rate of the HARQ-ACKs with the lower priority may be higher than that of the HARQ-ACKs with the higher priority, if the PUCCH resources are determined only according to the number of UCI bits, it may waste PUCCH resources. For example, for PUCCH format 4, the numbers of PRBs and OFDM symbols are fixed, so the number of PRBs cannot be determined according to a number of REs actually needed. According to the above-described method, the PUCCH resource set/PUCCH resources may be determined according to the number of UCI bits and the predefined parameter related to the code rate, so more reasonable PUCCH resources may be selected, thereby improving the spectrum efficiency of the system.

The UCI with different priorities may be multiplexed in a PUCCH (e.g., PUCCH with the higher priority), where the UCI with different priorities are separately encoded. The TX power of the PUCCH may be determined according to numbers of HARQ-ACK bits with different priorities for PUCCH power control (e.g., 3GPP parameters $n_{HARQ-ACK}(i)$ and/or $O_{ACK}(i)$) and/or a predefined parameter. The number of the HARQ-ACK bits for PUCCH power control (e.g., the 3GPP parameters $n_{HARQ-ACK}(i)$ and/or $O_{ACK}(i)$) may be determined based on at least one of a number of HARQ-ACK information bits with the higher priority for power control, a number of HARQ-ACK information bits with the lower priority for power control, and the predefined parameter. For example, the predefined parameter may be used to adjust the number of the HARQ-ACK information bits with the lower priority for power control, and may be related to a code rate (e.g. maximum code rate) of the HARQ-ACK information with the higher priority for power control and/or a code rate (e.g. maximum code rate) of the HARQ-ACK information with the lower priority for power control.

If the UE transmits the PUCCH on active UL BWP b of carrier f in primary cell c using PUCCH power control adjustment state with index 1, the UE determines the PUCCH TX power $P_{PUCCH,b,f,c}(i,q_u,q_d,l)$ in PUCCH TX occasion i as in Equation (8) below:

$$P_{PUCCH,b,f,c}(i, q_u, q_d, l) = \min\begin{Bmatrix} P_{CMAX,f,c}(i), \\ P_{O\_PUCCH,b,f,c}(q_u) + 10\log_{10}(2^{\mu} \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix} [dBm] \quad (8)$$

In Equation (8):
- $P_{CMAX,f,c}(i)$ is the configured maximum output power for carrier f of primary cell c in PUCCH TX occasion i.
- $P_{O\_PUCCH,b,f,c}(q_u)$ is an open loop power parameter. For example, it may be determined in the manner specified in 3GPP TS38.213.
- $M_{RB,b,f,c}^{PUCCH}(i)$ is a TX bandwidth of the PUCCH for PUCCH TX occasion i on active UL BWP b of carrier f of primary cell c, with a unit of RB. It should be noted that a subcarrier spacing of BWP b is μ.
- $PL_{b,f,c}(q_d)$ a parameter related to pathloss. For example, it may be determined in the manner specified in 3GPP TS38.213.
- $\Delta_{F\_PUCCH}(F)$ is a parameter related to PUCCH format. For example, it may be determined in the manner specified in 3GPP TS38.213.
- $g_{b,f,c}(i,l)$ is a closed loop power parameter. For example, it may be determined in the manner specified in 3GPP TS38.213.
- $\Delta_{TF,b,f,c}(i)$ is a PUCCH TX power adjustment parameter for PUCCH TX occasion i on active UL BWP b of carrier b of primary cell c,
- For PUCCH format 0 or PUCCH format 1, $\Delta_{TF,b,f,c}(i)$ may be determined in the manner specified in 3GPP TS38.213.
- For PUCCH format 2 and/or PUCCH format 3 and/or PUCCH format 4 and for a number of UCI bits (e.g., UCI(s) with the higher priority) smaller than or equal to 11, $\Delta_{TF,b,f,c}(i)=10 \log_{10}(K_1 \cdot (n_{HARQ-ACK}(i)+O_{SR}(i)+O_{CSI}(i))/N_{RE}(i))$, where
- $K_1=6$
- $n_{HARQ-ACK}(i)$ is a number of HARQ-ACK information bits for power control.
- $n_{HARQ-ACK}(i)$ may be determined based on at least one of the number of HARQ-ACK information bits with the higher priority for power control, the number of HARQ-ACK information bits with the lower priority for power control, and the predefined parameter. For example, the predefined parameter may be used to adjust the number of the HARQ-ACK information bits with the lower priority for power control, and may be related to a code rate (e.g. maximum code rate) of the HARQ-ACK information with the higher priority for power control and/or a code rate (e.g. maximum code rate) of the HARQ-ACK information with the lower priority for power control. $n_{HARQ\text{-}ACK}(i)$ may be a sum of the number of HARQ-ACK information bits with the higher priority for power control and a value obtained by multiplying the number of HARQ-ACK information bits with the lower priority for power control by the predefined parameter (e.g., denoted by a parameter $\alpha$). A number of HARQ-ACK information bits with a certain priority for power control (e.g., the 3GPP parameters $n_{HARQ\text{-}ACK}(i)$ and/or $O_{ACK}(i)$) may be determined according to the method specified in 3GPP TS38.213.

$O_{SR}(i)$ is a number of SR and/or LRR information bits, for example, $O_{SR}(i)$ may be a number of SR and/or LRR information bits with the priority index of the higher priority. For example, it may be determined according to the manner specified in section 9.2.5.1 of 3GPP TS 38.213.

$O_{CSI}(i)$ is a number of CSI information bits which may be determined, e.g., according to the manner specified in section 9.2.5.2 of 3GPP TS38.213. For example, a number of CSI information bits with the higher priority may be 0.

$O_{CRC}(i)$ is a number of CRC bits, and for example, $O_{CSI}(i)$ may be a number of CRC bits with the lower priority.

$N_{RE}(i)$ is a number of REs (resource elements) for transmitting the UCI. $N_{RE}(i) = M_{RB,b,f,c}^{PUCCH}(i) \cdot N_{sc,ctrl}^{RB}(i) \cdot N_{symb\text{-}UCI,b,f,c}^{PUCCH}(i)$, where $N_{sc,ctrl}^{RB}(i)$ is a number of subcarriers per resource block excluding subcarriers used for DMRS, and $N_{symb,UCI,b,f,c}^{PUSCH}(i)$ is a number of OFDM symbols excluding OFDM symbols used for DMRS.

For PUCCH format 2 and/or PUCCH format 3 and/or PUCCH format 4 and for a number of UCI bits (e.g., UCI(s) with the higher priority) larger than 11, $\Delta_{TF,b,f,c}(i) = 10 \log_{10}(2^{K_2 \cdot BPRE(i)} - 1)$, where $K_2 = 2.4$ $BPRE(1) = (O_{ACK}(i) + O_{SR}(i) + O_{CSI}(i) + O_{CRC}(i)/N_{RE}(i)$ $O_{ACK}(i)$ is a number of HARQ-ACK information bits for power control. $O_{ACK}(i)$ may be determined based on at least one of the number of HARQ-ACK information bits with the higher priority for power control, the number of HARQ-ACK information bits with the lower priority for power control, and the predefined parameter. For example, the predefined parameter is used to adjust the number of the HARQ-ACK information bits with the lower priority for power control, and may be related to a code rate (e.g. maximum code rate) of the HARQ-ACK information with the higher priority for power control and/or a code rate (e.g. maximum code rate) of the HARQ-ACK information with the lower priority for power control. $O_{ACK}(i)$ may be a sum of the number of HARQ-ACK information bits with the higher priority for power control and a value obtained by multiplying the number of HARQ-ACK information bits with the lower priority for power control by the predefined parameter (e.g., denoted by a parameter $\alpha$).

It should be noted that a number of HARQ-ACK information bits with a certain priority for power control (e.g., the 3GPP parameters $n_{HARQ\text{-}ACK}(i)$ and/or $O_{ACK}(i)$) may be determined according to the method specified in 3GPP TS38.213.

$O_{SR}(i)$ is a number of SR and/or LRR information bits; for example, $O_{SR}(i)$ may be a number of SR and/or LRR information bits with the priority index of the higher priority. For example, it may be determined according to the manner specified in 3GPP TS 38.213 9.2.5.1.

$O_{CSI}(i)$ is a number of CSI information bits which may be determined, e.g., according to the manner specified in section 9.2.5.2 of 3GPP TS38.213. For example, a number of CSI information bits with the higher priority may be 0.

$O_{CRC}(i)$ is a number of CRC bits, e.g., $O_{CSI}(i)$ may be a sum of numbers of CRC bits with different priorities.

$N_{RE}(i)$ is a number of Res for transmitting the UCI(s). $N_{RE}(i) = M_{RB,b,f,c}^{PUCCH}(i) \cdot N_{sc,ctrl}^{RB}(i) \cdot N_{symb\text{-}UCI,b,f,c}^{PUCCH}(i)$, where $N_{sc,ctrl}^{RB}(i)$ is a number of subcarriers per resource block excluding subcarriers used for DMRS, and $N_{symb\text{-}UCI,b,f,c}^{PUSCH}(i)$ is a number of OFDM symbols excluding OFDM symbols used for DMRS.

In accordance with the embodiments of the disclosure, the predefined parameter $\alpha$ may be configured by higher layer signaling or may be an offset defined in other embodiments of the present disclosure. Alternatively, the predefined parameter $\alpha$ may be a ratio between the code rate (e.g., maximum code rate) of the HARQ-ACKs with the lower priority and the code rate (e.g., maximum code rate) of the HARQ-ACKs with the higher priority and/or SRs.

In accordance with the above-described embodiments of the disclosure a power calculating method is provided for use when multiplexing UCI with different priority indexes in a PUCCH TX. The reliability of the PUCCH TX may be improved by determining power through the total UCI. When the power is limited, a method for ensuring the reliability of UCI with the high priority is defined, which may improve the reliability of UCI TX with the high priority. By configuring the parameters, the flexibility of scheduling may be increased, and UCI with the low priority may be transmitted as much as possible while ensuring the reliability of the UCI TX with the high priority.

Figure 6:
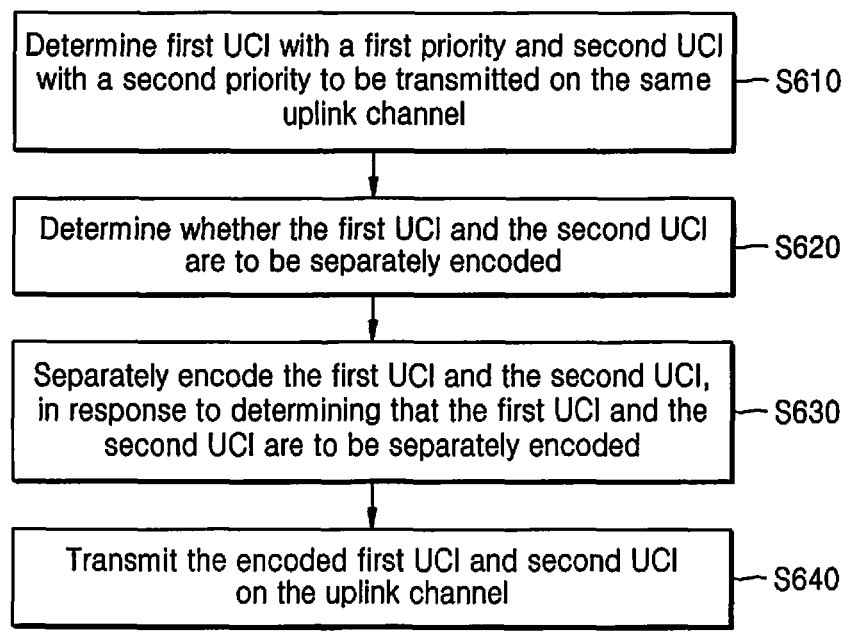
FIG. 6 is a flowchart illustrating a method performed by a UE according to an embodiment.

FIG. 6 is a flowchart illustrating a method performed by a UE according to an embodiment.

Referring to FIG. 6, in step S610, the UE determines first UCI with a first priority and second UCI with a second priority to be transmitted in the same uplink channel, where the first priority is different from the second priority. For example, the first priority may be higher than the second priority.

The type of each of the first UCI and the second UCI includes at least one of HARQ-ACK information, an SR, an LRR, or CSI.

The uplink channel includes a PUCCH or a PUSCH.

In step S620, the UE determines whether the first UCI and the second UCI are to be separately encoded.

Determining whether the first UCI and the second UCI are to be separately encoded may include at least one of receiving higher layer signaling indicating whether the first UCI and the second UCI are to be separately encoded from a base station, or receiving physical layer signaling indicating whether the first UCI and the second UCI are to be separately encoded from the base station.

Determining whether the first UCI and the second UCI are to be separately encoded may also include determining whether the first UCI and the second UCI are separately encoded by a predefined rule.

The predefined rule may include at least one of:
determining whether the first UCI and the second UCI are to be separately encoded according to the priority of the uplink channel carrying the first UCI and the second UCI;
determining whether the first UCI and the second UCI are to be separately encoded according to code rates and the number of physical resources of the first UCI and the second UCI;
determining whether the first UCI and the second UCI are to be separately encoded according to the number of bits of at least one of the first UCI and the second UCI;
determining whether the first UCI and the second UCI are to be separately encoded according to a coding type adopted by at least one of the first UCI and the second UCI;
determining whether the first UCI and the second UCI are to be separately encoded according to the number of bits of Cyclic Redundancy Check (CRC) corresponding to each of the first UCI and the second UCI;
determining whether the first UCI and the second UCI are to be separately encoded according to a HARQ-ACK codebook type; or
determining whether the first UCI and the second UCI are to be separately encoded according to whether a maximum code rate corresponding to one of the first priority and the second priority is configured in a PUCCH resource corresponding to the other of the first priority and the second priority.

The method of the UE determining whether the first UCI and the second UCI are to be separately encoded may refer to the above various embodiments, and detailed descriptions are omitted here.

In step S630, in response to determining that the first UCI and the second UCI are to be separately encoded, the UE separately encodes the first UCI and the second UCI.

The method may further include that, the UE may jointly code the first UCI and the second UCI in response to determining that the first UCI and the second UCI are not separately encoded.

In step S640, the UE transmits the encoded first UCI and second UCI on the uplink channel.

The method may further include determining maximum code rates of the first UCI and the second UCI. For example, the determined maximum code rates may be used for at least one of:
separately encoding the first UCI and the second UCI; or
determining the number of PRBs for the first UCI and the second UCI and/or a mode for RE mapping.

The determining of the maximum code rates of the first UCI and the second UCI may include at least one of:
when the first UCI and the second UCI are transmitted in a PUCCH format corresponding to one of the first priority and the second priority, determining a maximum code rate of UCI corresponding to the other of the first priority and the second priority according to a maximum code rate configured in a PUCCH format corresponding to the other of the first priority and the second priority;
when the first UCI and the second UCI are transmitted in the PUCCH format corresponding to one of the first priority and the second priority, determining a maximum code rate of UCI corresponding to the other of the first priority and the second priority according to a maximum code rate configured in a PUCCH format corresponding to the one of the first priority and the second priority, and an offset;
when the first UCI and the second UCI are transmitted in the PUCCH format corresponding to one of the first priority and the second priority, determining a maximum code rate of UCI corresponding to the other of the first priority and the second priority according to an additional maximum code rate configured in a PUCCH format corresponding to the one of the first priority and the second priority; or
when the first UCI and the second UCI are transmitted in the PUCCH format corresponding to one of the first priority and the second priority, determining a maximum code rate of UCI corresponding to the other of the first priority and the second priority according to a maximum code rate configured in a PUCCH resource corresponding to the other of the first priority and the second priority.

Transmitting the encoded first UCI and second UCI may include determining the number of PRBs for the first UCI and the second UCI and a resource element mode for RE mapping, and transmitting the encoded first UCI and second UCI based on the determined number of the PRBs and the mode for RE mapping.

Determining the number of the PRBs for the first UCI and the second UCI may include at least one of:
determining numbers of PRBs of the first UCI and the second UCI respectively, according to the first UCI, the second UCI and corresponding maximum code rates, and performing RE mapping based on at least one of the determined number of PRBs of the first UCI and number of PRBs of the second UCI; or
determining a total number of PRBs for the first UCI and the second UCI according to the number of bits of the first UCI and the second UCI and corresponding maximum code rates and performing RE mapping.

When the RE mapping is performed, UCI with the higher priority among the first UCI and the second UCI may be mapped first, and then remaining UCI of the first UCI and the second UCI may be mapped.

When the RE mapping is performed, UCI with the higher priority among the first UCI and the second UCI may be mapped to a symbol closer to a DMRS symbol.

The first priority may be higher than the second priority. When the determined number of the PRBs of the second UCI is less than a predefined or configured first threshold value, the second UCI may not be transmitted, or when a code rate for TX of the second UCI exceeds a predefined or configured second threshold value, the second UCI may not be transmitted.

The first priority may be higher than the second priority, and the transmitting of the encoded first UCI and second UCI may include determining a resource for the uplink channel TX, including at least one of:
receiving downlink control information DCI indicating the resource for the uplink channel TX from the base station; or
determining the resource for the uplink channel TX according to a predefined rule.

Determining the resource for the uplink channel TX according to the predefined rule may include at least one of:
determining the number of PRBs for the uplink channel TX, and when the determined number of the PRBs is less than or equal to the number of PRBs configured for a PUCCH format corresponding to the first priority, determining to use a PUCCH resource corresponding to the first priority;

determining to use a PUCCH resource corresponding to the second priority, when the determined number of the PRBs is larger than the number of PRBs configured in a PUCCH format corresponding to the first priority and less than or equal to the number of PRBs configured in a PUCCH format corresponding to the second priority; or determining to use a PUCCH resource corresponding to the first priority to only transmit the first UCI but not to transmit the second UCI, when the determined number of the PRBs is larger than the number of PRBs configured in a PUCCH format corresponding to the first priority and larger than the number of PRBs configured in a PUCCH format corresponding to the second priority.

According to an embodiment, a method for transmitting UCI is provided. The method includes determining a third UCI corresponding to a first cast type of a PDSCH and a fourth UCI corresponding to a second cast type of the PDSCH to be transmitted in the same uplink channel, where the first cast type is different from the second cast type; determining whether the third UCI and the fourth UCI are to be separately encoded; separately encoding the third UCI and the fourth UCI, in response to determining that the third UCI and the fourth UCI are to be separately encoded; and transmitting the encoded third UCI and fourth UCI to a base station on the uplink channel.

The first cast type is unicast, and the second cast type is groupcast.

If it is determined that the third UCI and the fourth UCI are not separately encoded, the third UCI and the fourth UCI are jointly encoded.

A method similar to that described in FIG. 6 may be adopted to determine whether the third UCI and the fourth UCI are to be separately encoded. For the sake of brevity, detailed descriptions are omitted here.

A method similar to that described in FIG. 6 may also be adopted to determine the maximum code rates of the third UCI and the fourth UCI. For the sake of brevity, detailed descriptions are omitted here.

The methods in various embodiments described above may be adopted to transmit the encoded third UCI and fourth UCI to the base station on the uplink channel.

Figure 7:
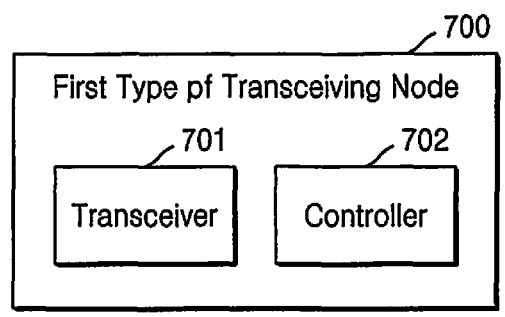
FIG. 7 illustrates a first type of transceiving node according to an embodiment.

FIG. 7 illustrates a first type of transceiving node according to an embodiment.

Referring to FIG. 7, a first type of transceiving node 700 includes a transceiver 701 and a controller 702.

The transceiver 701 may be configured to transmit first type of data and/or first type of control signal to a second type of transceiving node and receive second type of data and/or second type of control signal from the second type of transceiving node at a time unit.

The controller 702 may be an ASIC or at least one processor. The controller 702 may be configured to control the overall operation of the first type of transceiving node, including controlling the transceiver 701 to transmit the first type of data and/or the first type of control signal to the second type of transceiving node and receive the second type of data and/or the second type of control signal from the second type of transceiving node in a determined time unit, where this second type of data and/or second type of control signal and the time unit are determined by the second type of transceiving node based on received first type of data and/or first type of control signal.

As described above, a base station is taken as an example (but not limited thereto) to illustrate the first type of transceiving node, a UE is taken as an example (but not limited thereto) to illustrate the second type of transceiving node, a downlink time unit (but not limited thereto) is used to illustrate a first type of time unit, and a uplink time unit (but not limited thereto) is used to illustrate the time unit. DL data and/or DL control signaling (but not limited thereto) are used to illustrate the first type of data and/or the first type of control signal. A HARQ-ACK codebook may be included in the second type of control signal, and uplink control signal (but not limited thereto) is used to illustrate the second type of control signaling.

Figure 8:
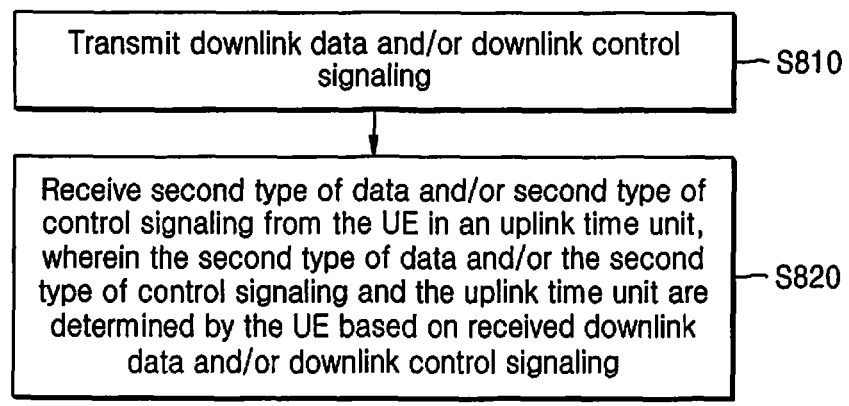
FIG. 8 is a flowchart illustrating a method performed by a base station according to an embodiment.

FIG. 8 is a flowchart illustrating a method 800 performed by a base station according to an embodiment.

Referring to FIG. 8, in step S810, the base station transmits DL data and/or a DL control signal to a UE.

In step S820, the base station receives a second type of data and/or a second type of control signal from the UE at an uplink time unit, where the second type of data and/or the second type of control signal and the uplink time unit are determined by the UE based on received DL data and/or DL control signal.

Those skilled in the art will understand that the base station may decode the second type of data and/or the second type of control signal based on a method corresponding to the method performed by the UE in the above embodiments.

FIG. 9 is a flowchart illustrating a method performed by a base station according to an embodiment.

Referring to FIG. 9, in step S910, the base station receives first UCI with a first priority and second UCI with a second priority from a UE on the same uplink channel, where the first priority is different from the second priority, and where the first UCI and the second UCI are separately encoded.

The method may further include transmitting higher layer signaling indicating that the first UCI and the second UCI are to be separately encoded to the UE.

The method may further includes transmitting physical layer signaling indicating that the first UCI and the second UCI are to be separately encoded to the UE.

A type of each of the first UCI and the second UCI includes at least one of HARQ-ACK information, an SR, an LRR, or CSI.

The uplink channel includes a PUCCH or a PUSCH.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the invention of the present disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system.

Technicians may implement the described functional sets in different ways for each specific application, but such design decisions should not be interpreted as causing a departure from the scope of this application.

According to some embodiments, a computer-readable storage medium having one or more computer programs stored thereon is further provided, where the one or more computer programs, when executed by one or more processors, may implement any of the methods described above.

The various illustrative logic blocks, modules, and circuits described in this application may be implemented or performed by a general purpose processor, a digital signal processor (DSP), an ASIC, a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, erasable programmable ROM (EPROM) memory, electrically EPROM (EEPROM) memory, a register, a hard disk, a removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a user equipment (UE) in a wireless communication system, the method comprising:

receiving, from a base station, information including parameters related to a maximum code rate, wherein each parameter related to the maximum code rate is respectively configured for a physical uplink control channel (PUCCH) format 2 and PUCCH format 3;

receiving, from the base station, information including parameters related to an additional maximum code rate, wherein each parameter related to the additional maximum code rate is respectively configured for the PUCCH format 2 and the PUCCH format 3;

based on (i) a PUCCH format corresponding to the PUCCH format 2 or the PUCCH format 3, (ii) a maximum code rate configured for the PUCCH format, and (iii) an additional maximum code rate configured for the PUCCH format, determining a first maximum code rate of a first uplink control information (UCI) with a first priority and a second maximum code rate of a second UCI with a second priority;

determining a minimum number of physical resource blocks (PRBs), $M_{PB,min}^{PUCCH}$, of the PUCCH format based on $$M_{RB,min}^{PUCCH} = \left\lceil \frac{(O_{ACK}^0 + O_{CRC}^0)}{N_{sc,ctrl}^{RB} \cdot N_{symb-UCI}^{PUCCH} \cdot Q_m \cdot r^0} + \frac{(O_{ACK}^1 + O_{CRC}^1)}{N_{sc,ctrl}^{RB} \cdot N_{symb-UCI}^{PUCCH} \cdot Q_m \cdot r^1} \right\rceil,$$

where $r^0$ is the second maximum code rate of the second UCI, $r^1$ the first maximum code rate of the first UC, $O_{ACE}^0$ is a number of bits of the second UCI, $O_{CRC}^0$ is a number of bits of the CRC for the second UCI, $O_{ACE}^1$ is a number of bits of the first UCI, $O_{CRC}^1$ is a number of bits of the CRC for the first UCI, $N_{sc,ctrl}^{RB}$ is a number of subcarriers, $N_{symbUCI}^{PUCCH}$ is a number of OFDM symbols, an $Q_m$ is a modulation order; and based on the minimum number of PRBs of the PUCCH format, transmitting, to the base station, via a PUCCH using the PUCCH format, the first UCI with the first priority and the second UCI with the second priority.

2. The method of claim 1, further comprising:

receiving, from the base station, a PUCCH configuration list including a first PUCCH configuration with a second priority and a second PUCCH configuration with a first priority; and in case that the PUCCH format is included in the second PUCCH configuration with the first priority, determining the first maximum code rate of the first UCI with the first priority among the parameters related to the maximum code rate associated with the second PUCCH configuration with the first priority, and determining the second maximum code rate of the second UCI with the second priority among the parameters related to the additional maximum code rate associated with the second PUCCH configuration with the first priority.

3. The method of claim 1, further comprising separately encoding the first UCI with the first priority and the second UCI with the second priority.

4. The method of claim 3, wherein a number of bits of the first UCI with the first priority is larger than a first predefined value or a number of bits of the second UCI with the second priority is larger than a second predefined value.

5. The method of claim 3, further comprising:

jointly encoding a third UCI and a fourth UCI, wherein the third UCI and the fourth UCI are different types and have a same priority; and transmitting the third UCI and the fourth UCI via the PUCCH.

6. The method of claim 1, further comprising, in case that the PUCCH format is PUCCH format 3 and the minimum number of PRBs of the PUCCH format is not equal to $2^{\alpha_2} \cdot 3^{\alpha_3} \cdot 5^{\alpha_5}$, wherein the $\alpha_2$, $\alpha_3$, and $\alpha_5$ are non-negative integers, increasing the minimum number of PRBs of the PUCCH format to a nearest value to $2^{\alpha_2} \cdot 3^{\alpha_3} \cdot 5^{\alpha_5}$.

7. The method of claim 1, further comprising, in case that the minimum number of PRBs of the PUCCH format is larger than a maximum available number of PRBs of the PUCCH format, transmitting the PUCCH over the maximum available number of PRBs of the PUCCH format.

8. The method of claim 1, further comprising:
based on the first maximum code rate of the first UCI, determining a first rate matching output sequence length of the first UCI; and
based on the first rate matching output sequence length of the first UCI, determining a second rate matching output sequence length of the second UCI.

9. A user equipment (UE) in a wireless communication system, the UE comprising:
a transceiver; and
at least one processor coupled with the transceiver and configured to:
receive, from a base station, information including parameters related to a maximum code rate, wherein each parameter related to the maximum code rate is respectively configured for a physical uplink control channel (PUCCH) format 2 and a PUCCH format 3,
receive, from the base station, information including parameters related to an additional maximum code rate, wherein each parameter related to the additional maximum code rate is respectively configured for the PUCCH format 2 and the PUCCH format 3,
based on (i) a PUCCH format corresponding to the PUCCH format 2 or the PUCCH format 3, (ii) a maximum code rate configured for the PUCCH format, and (iii) an additional maximum code rate configured for the PUCCH format, determine a first maximum code rate of a first uplink control information (UCI) with a first priority and a second maximum code rate of a second UCI with a second priority,
determine a minimum number of physical resource blocks (PRBs), $M_{RB,min}^{PUCCH}$, of the PUCCH format based on $$M_{RB,min}^{PUCCH} = \left\lceil \frac{(O_{ACK}^0 + O_{CRC}^0)}{N_{sc,ctrl}^{RB} \cdot N_{symb-UCI}^{PUCCH} \cdot Q_m \cdot r^0} + \frac{(O_{ACK}^1 + O_{CRC}^1)}{N_{sc,ctrl}^{RB} \cdot N_{symb-UCI}^{PUCCH} \cdot Q_m \cdot r^1} \right\rceil,$$

where $r^0$ is the second maximum code rate of the second UCI, $r^1$ is the first maximum code rate of the first UCI, $O_{ACK}^0$ is a number of bits of the second UCI, $O_{CRC}^0$ is a number of bits of the CRC for the second UCI, $O_{ACK}^1$ is a number of bits of the first UCI, $O_{CRC}^1$ is a number of bits of the CRC for the first UCI, $N_{sc,ctrl}^{RB}$ is a number of subcarriers, $N_{symb-UCI}^{PUCCH}$ is a number of OFDM symbols, and $Q_m$ is a modulation order, and
based on the minimum number of PRBs of the PUCCH format, transmit, to the base station, via a PUCCH using the PUCCH format, the first UCI with the first priority and the second UCI with the second priority.

10. The UE of claim 9, wherein the at least one processor is further configured to:
receive, from the base station, a PUCCH configuration list including a first PUCCH configuration with a second priority and a second PUCCH configuration with a first priority, and
in case that the PUCCH format is included in the second PUCCH configuration with the first priority, determine the first maximum code rate of the first UCI with the first priority among the parameters related to the maximum code rate associated with the second PUCCH configuration with the first priority, and determine the second maximum code rate of the second UCI with the second priority among the parameters related to the additional maximum code rate associated with the second PUCCH configuration with the first priority.

11. The UE of claim 9, wherein the at least one processor is further configured to separately encode the first UCI with the first priority and the second UCI with the second priority.

12. The UE of claim 11, wherein a number of bits of the first UCI with the first priority is larger than a first predefined value or a number of bits of the second UCI with the second priority is larger than a second predefined value.

13. The UE of claim 11, wherein the at least one processor is further configured to:
jointly encode a third UCI and a fourth UCI, wherein the third UCI and the fourth UCI are different types and have a same priority, and
transmit the third UCI and the fourth UCI via the PUCCH.

14. The UE of claim 9, wherein the at least one processor is further configured to, in case that the minimum number of PRBs of the PUCCH format is larger than a maximum available number of PRBs of the PUCCH format, transmit the PUCCH over the maximum available number of PRBs of the PUCCH format.

15. The UE of claim 9, wherein the at least one processor is further configured to:
based on the first maximum code rate of the first UCI, determine a first rate matching output sequence length of the first UCI, and
based on the first rate matching output sequence length of the first UCI, determine a second rate matching output sequence length of the second UCI.

16. A method performed by a base station (BS) in a wireless communication system, the method comprising:
transmitting, to a user equipment (UE), information including parameters related to a maximum code rate, wherein each parameter related to the maximum code rate is respectively configured for a physical uplink control channel (PUCCH) format 2 and a PUCCH format 3;
transmitting, to the UE, information including parameters related to an additional maximum code rate, wherein each parameter related to the additional maximum code rate is respectively configured for the PUCCH format 2 and the PUCCH format 3; and
receiving, from the UE, via a PUCCH using a PUCCH format, a first uplink control information (UCI) with a first priority and a second UCI with a second priority,
wherein, based on (i) the PUCCH format corresponding to the PUCCH format 2 or the PUCCH format 2, (ii) a maximum code rate configured for the PUCCH format, and (iii) an additional maximum code rate configured for the PUCCH format, a first maximum code rate of the first UCI with the first priority and a second maximum code rate of the second UCI with the second priority are determined, and
wherein a minimum number of physical resource blocks (PRBs), $N_{RB,minhu\ PUCCH}$, of the PUCCH format is determined based on $$M_{RB,min}^{PUCCH} = \left\lceil \frac{(O_{ACK}^0 + O_{CRC}^0)}{N_{sc,ctrl}^{RB} \cdot N_{symb-UCI}^{PUCCH} \cdot Q_m \cdot r^0} + \frac{(O_{ACK}^1 + O_{CRC}^1)}{N_{sc,ctrl}^{RB} \cdot N_{symb-UCI}^{PUCCH} \cdot Q_m \cdot r^1} \right\rceil,$$

where $r^0$ is the second maximum code rate of the second UCI, $r^1$ is the first maximum code rate of the first UCI, $O_{ACK}^0$ is a number of bits of the second UCI, $O_{CRC}^0$ is a number of bits of the CRC for the second UCI, $O_{ACK}^1$ is a number of bits of the first UCI, $O_{CRC}^1$ is a number of bits of the CRC for the first UCI, $N_{sc,ctrl}^{RB}$ is a number of subcarrier, $N_{symb-UCI}^{PUCCH}$ is a number of OFDM symbols, and $Q_m$ is a modulation order.

17. A base station (BS) in a wireless communication system, the BS comprising:
- a transceiver; and
- at least one processor coupled with the transceiver and configured to:
  - transmit, to a user equipment (UE), information including parameters related to a maximum code rate, wherein each parameter related to the maximum code rate is respectively configured for a physical uplink control channel (PUCCH) format 2 and a PUCCH format 3,
  - transmit, to the UE, information including parameters related to an additional maximum code rate, wherein each parameter related to the additional maximum code rate is respectively configured for the PUCCH format 2 and the PUCCH format 2, and
  - receive, from the UE, via a PUCCH using a PUCCH format, a first uplink control information (UCI) with a first priority and a second UCI with a second priority, wherein, based on (i) the PUCCH format corresponding to the PUCCH format 2 or the PUCCH format 3, (ii) a maximum code rate configured for the PUCCH format, and (iii) an additional maximum code rate configured for the PUCCH format, a first maximum code rate of the first UCI with the first priority and a second maximum code rate of the second UCI with the second priority are determined, and wherein a minimum number of physical resource blocks (PRBs), $M_{RB,\,min}^{PUCCH}$, of the PUCCH format is determined based on $$M_{RB,min}^{PUCCH} = \left\lceil \frac{(O_{ACK}^0 + O_{CRC}^0)}{N_{sc,ctrl}^{RB} \cdot N_{symb-UCI}^{PUCCH} \cdot Q_m \cdot r^0} + \frac{(O_{ACK}^1 + O_{CRC}^1)}{N_{sc,ctrl}^{RB} \cdot N_{symb-UCI}^{PUCCH} \cdot Q_m \cdot r^1} \right\rceil,$$

where $r^0$ is the second maximum code rate of the second UCI, $r^1$ is the first maximum code rate of the first UCI, $O_{ACK}^0$ is a number of bits of the second UCI, $O_{CRC}^0$ is a number of bits of the CRC for the second UCI, $O_{ACK}^1$ is a number of bits of the first UCI, $O_{CRC}^1$ is a number of the bits of the CRC for the first UCI, $N_{sc,ctrl}^{RB}$ is a number of subcarriers, $N_{symb-UCI}^{PUCCH}$ is a number of OFDM symbols, and $Q_m$ is a modulation order.

\* \* \* \* \*